(12) United States Patent
Peng et al.

(10) Patent No.: US 12,022,541 B2
(45) Date of Patent: Jun. 25, 2024

(54) COMMUNICATION METHOD AND COMMUNICATIONS APPARATUS

(71) Applicant: Huawei Technologies Co., Ltd., Shenzhen (CN)

(72) Inventors: Wenjie Peng, Shanghai (CN); Mingzeng Dai, Shenzhen (CN); Jun Wang, Shanghai (CN); Dongdong Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 17/939,496

(22) Filed: Sep. 7, 2022

(65) Prior Publication Data

US 2023/0007712 A1 Jan. 5, 2023

Related U.S. Application Data

(63) Continuation of application No. 17/487,797, filed on Sep. 28, 2021, now Pat. No. 11,470,662, which is a
(Continued)

(30) Foreign Application Priority Data

Mar. 29, 2019 (CN) .......................... 201910253437.9

(51) Int. Cl.
*H04W 76/14* (2018.01)
*H04L 5/00* (2006.01)
(Continued)

(52) U.S. Cl.
CPC ............ *H04W 76/14* (2018.02); *H04L 5/0051* (2013.01); *H04W 4/06* (2013.01); *H04W 4/40* (2018.02); *H04W 24/10* (2013.01); *H04W 92/18* (2013.01)

(58) Field of Classification Search
CPC ......... H04L 5/0048; H04L 5/005–0051; H04L 5/0053; H04W 4/06; H04W 4/40–48;
(Continued)

(56) References Cited

U.S. PATENT DOCUMENTS 10,511,422 B2   12/2019   Kim et al.
10,638,380 B2   4/2020    Lu et al.
(Continued)

FOREIGN PATENT DOCUMENTS

CN   105917733 A   8/2016
CN   106792430 A   5/2017
(Continued)

OTHER PUBLICATIONS

"Discussion on Reference Signal for Sidelink Control and Data Channel Design," Agenda Item: 7.2.4.1.5, Source: Huawei, HiSilicon, Document for: Discussion and decision, 3GPP TSG RAN WG1 Meeting #95, R1-1812207, Spokane, USA, Nov. 12-16, 2018, 6 pages.
(Continued)

*Primary Examiner* — Thomas R Cairns
(74) *Attorney, Agent, or Firm* — Slater Matsil, LLP

(57) ABSTRACT

A method includes: a first terminal device receives first information from a network device, where the first information includes an indication information of a first unicast connection and a reference signal configuration corresponding to the first unicast connection, the reference signal configuration is used by the first terminal device to send a reference signal to a second terminal device; and the first terminal device sends the reference signal to the second terminal device on a sidelink based on the reference signal configuration.

20 Claims, 8 Drawing Sheets

Related U.S. Application Data continuation of application No. PCT/CN2020/081443, filed on Mar. 26, 2020.

(51) Int. Cl.
*H04W 4/06* (2009.01)
*H04W 4/40* (2018.01)
*H04W 24/10* (2009.01)
*H04W 92/18* (2009.01)

(58) Field of Classification Search
CPC ....... H04W 8/005; H04W 8/24; H04W 8/245; H04W 24/08; H04W 24/10; H04W 76/10; H04W 76/14; H04W 76/23; H04W 84/18; H04W 88/04; H04W 92/18
See application file for complete search history.

(56) References Cited

U.S. PATENT DOCUMENTS

| | | | |
|---|---|---|---|
| 10,863,447 | B2 | 12/2020 | Guo |
| 10,904,933 | B2* | 1/2021 | Bangolae ............. H04W 88/04 |
| 10,979,960 | B2 | 4/2021 | Wang et al. |
| 2014/0307611 | A1 | 10/2014 | Tesanovic et al. |
| 2016/0100355 | A1* | 4/2016 | Chen ................. H04W 72/1215 370/232 |
| 2017/0034842 | A1 | 2/2017 | Xiaodong et al. |
| 2017/0215098 | A1* | 7/2017 | Huang ................. H04W 76/14 |
| 2017/0215183 | A1 | 7/2017 | Gulati et al. |
| 2018/0014345 | A1 | 1/2018 | Sartori et al. |
| 2018/0049259 | A1 | 2/2018 | Aminaka et al. |
| 2018/0124621 | A1 | 5/2018 | Jung et al. |
| 2018/0199390 | A1 | 7/2018 | Hahn et al. |
| 2018/0206176 | A1 | 7/2018 | Panteleev et al. |
| 2018/0242228 | A1 | 8/2018 | Jung et al. |
| 2019/0052436 | A1 | 2/2019 | Desai et al. |
| 2021/0194647 | A1 | 6/2021 | Zhao et al. |
| 2021/0259039 | A1* | 8/2021 | Pan ................... H04W 28/0967 |
| 2021/0266846 | A1 | 8/2021 | Do et al. |
| 2021/0266868 | A1 | 8/2021 | Shin et al. |
| 2021/0400665 | A1 | 12/2021 | Zhao et al. |

FOREIGN PATENT DOCUMENTS

| | | | |
|---|---|---|---|
| CN | 106998575 | A | 8/2017 |
| CN | 107211430 | A | 9/2017 |
| CN | 107637162 | A | 1/2018 |
| CN | 107646198 | A | 1/2018 |
| CN | 107995605 | A | 5/2018 |
| CN | 108141340 | A | 6/2018 |
| CN | 108322414 | A | 7/2018 |
| CN | 108370565 | A | 8/2018 |
| CN | 108684218 | A | 10/2018 |
| CN | 109076478 | A | 12/2018 |
| CN | 109155941 | A | 1/2019 |
| CN | 109479221 | A | 3/2019 |
| EP | 3399687 | A1 | 11/2018 |
| EP | 3477996 | A1 | 5/2019 |
| WO | 2016144574 | A1 | 9/2016 |
| WO | 2016204573 | A1 | 12/2016 |
| WO | 2017113175 | A1 | 7/2017 |
| WO | 2017116108 | A1 | 7/2017 |
| WO | 2018010123 | A1 | 1/2018 |

OTHER PUBLICATIONS

3GPP TS 36.413 V15.4.0 (Dec. 2018), 3rd Generation Partnership Project; Technical Specification Group Radio Access Network; Evolved Universal Terrestrial Radio Access Network (E-UTRAN); S1 Application Protocol (S1AP) (Release 15), 383 pages.
3GPP TS 38.214 V15.5.0 (Mar. 2019), 3rd Generation Partnership Project; Technical Specification Group Radio Access Network; NR; Physical layer procedures for data (Release 15), 103 pages.
3GPP TS 38.300 V15.4.0 (Dec. 2018), 3rd Generation Partnership Project; Technical Specification Group Radio Access Network; NR; NR and NG-RAN Overall Description; Stage 2 (Release 15), 97 pages.
3GPP TS 38.331 V15.4.0 (Dec. 2018), 3rd Generation Partnership Project; Technical Specification Group Radio Access Network; NR; Radio Resource Control (RRC) protocol specification (Release 15), 474 pages.
Chen, J. et al., "Discussion on V2X Communication Technology for Intelligent Connected Vehicle", Telecom Technology, Telecommunications Technology, Issue 05, 2016, 5 pages.
LG (Rapporteur), "Report of [103bis#38] SL unicast/groupcast (LG)", 3GPP TSG-RAN WG2 #104, R2-1818496, Spokane, WA, US, Nov. 12-16, 2018, 20 pages.
LG Electronics, "Feature lead summary for agenda item 7.2.4.1.2 Physical layer procedures", 3GPP TSG RAN WG1 #96, R1-1903367, Athens, Greece, Feb. 25-Mar. 1, 2019, 24 pages.
OPPO, "Summary of [104#55][NR/V2X] Unicast (OPPO)", 3GPP TSG-RAN WG2 Meeting #105, R2-1900180, Athens, Greece, Feb. 25-Mar. 1, 2019, 28 pages.
OPPO, "TP for PC5-RRC based procedure for unicast in NR-V2X", 3GPP TSG-RAN WG2 Meeting #105, R2-1902502, Athens, Greece, Feb. 25-Mar. 1, 2019, 2 pages.
Samsung., "On Physical Layer Procedures for NR V2X", 3GPP TSG RAN WG1 #96, R1-1902274, Feb. 25-Mar. 1, 2019, 13 pages, Athens, Greece.
Vivo, "Sidelink unicast in NR", 3GPP TSG-RAN WG2 Meeting #103bis, R2-1813921, Chengdu, China, Oct. 8-12, 2018, 4 pages.
Vivo, "Sidelink unicast procedures in NR", 3GPP TSG-RAN WG2 Meeting #104, R2-1817108 (Revision of R2-1813921), Spokane, WA, US, Nov. 12-16, 2018, 4 pages.

* cited by examiner

# COMMUNICATION METHOD AND COMMUNICATIONS APPARATUS

CROSS-REFERENCE TO RELATED APPLICATIONS

This application is a continuation of U.S. patent application Ser. No. 17/487,797, filed on Sep. 28, 2021, which is a continuation of International Application No. PCT/CN2020/081443, filed on Mar. 26, 2020, which claims priority to Chinese Patent Application No. 201910253437.9, filed on Mar. 29, 2019. All of the afore-mentioned patent applications are hereby incorporated by reference in their entireties.

TECHNICAL FIELD

This application relates to the communications field, and more specifically, to a communication method and a communications apparatus.

BACKGROUND

The internet of vehicles (IoV) is one of important fields in an internet of things system. As communications technologies continuously develop, in a new radio (NR) technology, V2X (vehicle to everything) can support more communication types, for example, broadcast transmission, unicast transmission, or multicast transmission. In unicast transmission, channel quality and the like of a unicast connection between two user equipment (UE) may affect reliability of the unicast connection, and consequently, affecting communication quality or efficiency of a system.

Therefore, how to improve reliability of the unicast connection in V2X becomes an urgent problem to be resolved.

SUMMARY

This application provides a communication method and a communications apparatus, to implement measurement reporting of a unicast connection in V2X.

According to a first aspect, a communication method is provided. The method includes: receiving, by a first terminal device, first information sent by a network device, where the first information includes indication information of a first unicast connection and a reference signal configuration of the first unicast connection, the reference signal configuration is used by the first terminal device to send a reference signal to a second terminal device, and the first unicast connection is a unicast connection established by the first terminal device and the second terminal device on a sidelink; and sending, by the first terminal device, the reference signal to the second terminal device on the sidelink based on the reference signal configuration.

According to the communication method in this embodiment of this application, the first information sent by the network device includes the reference signal configuration of the first unicast connection, the reference signal configuration is used by the first terminal device to send the reference signal to the second terminal device, and the first unicast connection is a unicast connection established by the first terminal device and the second terminal device on the sidelink; and the first terminal device may send the reference signal to the second terminal device on the sidelink based on the reference signal configuration. In this way, measurement reporting of the unicast connection in V2X can be implemented, to help improve reliability of the unicast connection.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the first information further includes a measurement configuration of the first unicast connection, the measurement configuration is used by the second terminal device to perform measurement, and the method further includes: sending, by the first terminal device, the measurement configuration to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: receiving, by the first terminal device, second information sent by the second terminal device, where the second information is used to indicate that the second terminal device successfully completes configuration.

Optionally, the method further includes: sending, by the first terminal device, third information to the network device, where the third information is used to indicate that the first terminal device successfully completes configuration and/or the third information is used to indicate that the second terminal device successfully completes configuration.

Optionally, the method further includes: receiving, by the first terminal device, a measurement result from the second terminal device, where the measurement result is a result obtained by the second terminal device by measuring the reference signal on the first unicast connection.

Optionally, the method further includes: sending, by the first terminal device, the measurement result and the indication information of the first unicast connection to the network device.

According to a second aspect, a communication method is provided. The method includes: obtaining, by a second terminal device, a measurement configuration, where the measurement configuration is used by the second terminal device to perform measurement; receiving, by the second terminal device on a sidelink based on the measurement configuration, a reference signal sent by the first terminal device; and performing, by the second terminal device, measurement on the first unicast connection based on the reference signal, where the first unicast connection is a unicast connection established by the first terminal device and the second terminal device on the sidelink.

According to the communication method in this embodiment of this application, the second terminal device obtains the measurement configuration, receives, on the sidelink based on the measurement configuration, the reference signal sent by the first terminal device, and performs measurement on the first unicast connection. In this way, measurement reporting of the unicast connection in V2X can be implemented, to help improve reliability of the unicast connection.

Optionally, the obtaining, by a second terminal device, a measurement configuration includes: receiving, by the second terminal device, the measurement configuration sent by the first terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: sending, by the second terminal device, second information to the first terminal device, where the second information is used to indicate that the second terminal device successfully completes configuration.

Optionally, the method further includes: sending, by the second terminal device, a measurement result to the first terminal device, where the measurement result is a result obtained by the second terminal device by measuring the reference signal on the first unicast connection.

According to a third aspect, a communication method is provided. The method includes: generating, by a network device, first information, where the first information includes indication information of a first unicast connection and a reference signal configuration of the first unicast connection, the reference signal configuration is used by a first terminal device to send a reference signal to a second terminal device, and the first unicast connection is a unicast connection established by the first terminal device and the second terminal device on a sidelink; and sending, by the network device, the first information to the first terminal device.

According to the communication method in this embodiment of this application, the network device determines or generates the first information, and sends the first information to the first terminal device. The first information includes the reference signal configuration of the first unicast connection, the reference signal configuration is used by the first terminal device to send the reference signal to the second terminal device, and the first unicast connection is a unicast connection established by the first terminal device and the second terminal device on the sidelink. In this way, measurement reporting of the unicast connection in V2X can be implemented, to help improve reliability of the unicast connection.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the first information further includes a measurement configuration of the first unicast connection, and the measurement configuration is used by the second terminal device to perform measurement.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: receiving, by the network device, third information sent by the first terminal device, where the third information is used to indicate that the first terminal device successfully completes configuration and/or the third information is used to indicate that the second terminal device successfully completes configuration.

Optionally, the method further includes: receiving, by the network device, a measurement result and the indication information of the first unicast connection that are sent by the first terminal device, where the measurement result is a result obtained by the second terminal device by measuring the reference signal on the first unicast connection.

According to a fourth aspect, a communication method is provided. The method includes: receiving, by a first terminal device, first capability information from a second terminal device, where the first capability information includes a capability that can be allocated by the second terminal device to a unicast connection, or the first capability information includes a capability allocated by the second terminal device to the unicast connection, and the unicast connection is a unicast connection established by the first terminal device and the second terminal device on a sidelink; sending, by the first terminal device, second capability information to a network device, where the second capability information includes the capability allocated by the second terminal device to the unicast connection; receiving, by the first terminal device, configuration information from the network device, where the configuration information includes a configuration of the unicast connection; and performing, by the first terminal device, communication via the unicast connection based on the configuration information.

According to the communication method in this embodiment of this application, the first terminal device sends the second capability information to the network device, where the second capability information includes the capability allocated by the second terminal device to the unicast connection; the first terminal device receives the configuration information from the network device, where the configuration information includes the configuration of the unicast connection; and the first terminal device performs communication via the unicast connection based on the configuration information. This can ensure that the configuration information is valid for both the first terminal device and the second terminal device.

Optionally, the first capability information includes the capability allocated by the second terminal device to the unicast connection, and before the receiving, by a first terminal device, first capability information from a second terminal device, the method further includes: sending, by the first terminal device, third capability information to the second terminal device, where the third capability information includes a capability that can be allocated by the first terminal device to the unicast connection, or a capability allocated by the first terminal device to the unicast connection.

Optionally, the third capability information is carried in capability query information sent by the first terminal device to the second terminal device.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the configuration information includes the reference signal configuration, and the reference signal configuration is used by the first terminal device to send a reference signal to the second terminal device.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: sending, by the first terminal device, the reference signal to the second terminal device.

Optionally, the method further includes: receiving, by the first terminal device, a measurement result and indication information of the unicast connection from the second terminal device, where the measurement result is a result obtained by the second terminal device by measuring the reference signal on the unicast connection.

Optionally, the method further includes: sending, by the first terminal device, the measurement result and the indication information of the unicast connection to the network device.

Optionally, the method further includes: sending, by the first terminal device, fourth information to the network device, where the fourth information is used to indicate that configuration of the unicast connection is completed.

According to a fifth aspect, a communication method is provided. The method includes: obtaining, by a network device, capability information of a first terminal device; receiving, by the network device, second capability information from the first terminal device, where the second capability information includes a capability allocated by a second terminal device to a unicast connection, and the unicast connection is a unicast connection established by the first terminal device and the second terminal device on a sidelink; determining, by the network device, configuration information based on the capability information of the first terminal device and the second capability information, where the configuration information includes a configuration of the unicast connection; and sending, by the network device, the configuration information to the first terminal device, where the second capability information includes a capability that the unicast connection is to have after the first terminal device configures the unicast connection based on the configuration information; and a capability indicated by the capability information of the first terminal device includes the capability that the unicast connection is to have after the first terminal device configures the unicast connection based on the configuration information.

According to the communication method in this embodiment of this application, the network device receives the second capability information from the first terminal device, where the second capability information includes the capability allocated by the second terminal device to the unicast connection; and then the network device determines the configuration information based on the capability information of the first terminal device and the second capability information. This can ensure that the configuration information is valid for both the first terminal device and the second terminal device.

Optionally, the capability information of the first terminal device includes a capability that can be allocated by the first terminal device to the unicast connection, or the capability information of the first terminal device includes a capability allocated by the first terminal device to the unicast connection.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the configuration information includes the reference signal configuration, and the reference signal configuration is used by the first terminal device to send a reference signal to the second terminal device.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: receiving, by the network device, a measurement result and indication information of the unicast connection from the first terminal device, where the measurement result is a result obtained by the second terminal device by measuring the reference signal on the unicast connection.

Optionally, the method further includes: receiving, by the network device, fourth information from the first terminal device, where the fourth information is used to indicate that configuration of the unicast connection is completed.

According to a sixth aspect, a communication method is provided. The method includes: receiving, by a first terminal device, first capability information from a second terminal device, where the first capability information includes a capability that can be allocated by the second terminal device to a unicast connection, or the first capability information includes a capability allocated by the second terminal device to the unicast connection, and the unicast connection is a unicast connection established by the first terminal device and the second terminal device on a sidelink; determining, by the first terminal device, configuration information based on the first capability information and capability information of the first terminal device, where the configuration information includes a configuration of the unicast connection; and configuring, by the first terminal device, the unicast connection based on the configuration information, where the first capability information includes a capability that the unicast connection is to have after the first terminal device configures the unicast connection based on the configuration information, and the first capability includes a capability that the unicast connection is to have after the first terminal device configures the unicast connection based on the configuration information.

According to the communication method in this embodiment of this application, the first terminal device receives the first capability information from the second terminal device, where the first capability information includes the capability that can be allocated by the second terminal device to the unicast connection, or the first capability information includes the capability allocated by the second terminal device to the unicast connection; and then the first terminal device determines the configuration information based on the first capability information and the capability information of the first terminal device. This can ensure that the configuration information is valid for both the first terminal device and the second terminal device.

Optionally, the capability information of the first terminal device includes a capability that can be allocated by the first terminal device to the unicast connection, or the capability information of the first terminal device includes a capability allocated by the first terminal device to the unicast connection.

Optionally, the first capability information includes the capability allocated by the second terminal device to the unicast connection, and before the receiving, by a first terminal device, first capability information from a second terminal device, the method further includes: sending, by the first terminal device, the capability information of the first terminal device to the second terminal device.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the reference signal configuration includes first indication information and/or a first parameter configuration, the first indication information is used to indicate the first terminal device to send a reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: sending, by the first terminal device, the reference signal to the second terminal device.

Optionally, the method further includes: receiving, by the first terminal device, a measurement result and indication information of the unicast connection from the second terminal device, where the measurement result is a result obtained by the second terminal device by measuring the reference signal on the unicast connection.

According to a seventh aspect, a communication method is provided. The method includes: receiving, by a first terminal device, first capability information from a second terminal device, where the first capability information includes a currently available capability of the second terminal device, the first capability information includes a total capability of the second terminal device, or the first capability information includes a capability used by the second terminal device for the unicast connection, and the unicast connection is a unicast connection established by the first terminal device and the second terminal device on a sidelink; and performing, by the first terminal device, communication via the unicast connection based on configuration information, where the configuration information includes a configuration of the unicast connection.

Optionally, before the performing, by the first terminal device, communication via the unicast connection based on configuration information, the method further includes: determining, by the first terminal device, the configuration information based on the first capability information.

According to the communication method in this embodiment of this application, the first terminal device receives the first capability information from the second terminal device, where the first capability information includes the currently available capability of the second terminal device, the first capability information includes the total capability of the second terminal device, or the first capability information includes the capability used by the second terminal device for the unicast connection; and then, the first terminal device determines the configuration information based on the first capability information. This can ensure that the configuration information is valid for the second terminal device.

Optionally, the determining, by the first terminal device, the configuration information based on the first capability information includes: determining, by the first terminal device, the configuration information based on the first capability information and capability information of the first terminal device.

According to the communication method in this embodiment of this application, the first terminal device determines the configuration information based on the first capability information and the capability information of the first terminal device. This can ensure that the configuration information is valid for both the first terminal device and the second terminal device.

Optionally, the performing, by the first terminal device, communication via the unicast connection based on configuration information further includes: configuring, by the first terminal device, the unicast connection based on the configuration information, where a capability indicated by the capability information of the first terminal device includes a capability that the unicast connection is to have after the first terminal device configures the unicast connection based on the configuration information; and performing, by the first terminal device, communication via the unicast connection.

Optionally, the capability information of the first terminal device includes a currently available capability of the first terminal device, the capability information of the first terminal device includes a total capability of the first terminal device, or the capability information of the first terminal device includes a capability used by the first terminal device for the unicast connection.

Optionally, a capability indicated by the capability information of the first terminal device is the capability used by the second terminal device for the unicast connection, and before the receiving, by a first terminal device, first capability information from a second terminal device, the method further includes: sending, by the first terminal device, the capability information of the first terminal device to the second terminal device.

Optionally, the capability information of the first terminal device is carried in capability query information sent by the first terminal device to the second terminal device.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the reference signal configuration includes first indication information and/or a first parameter configuration, the first indication information is used to indicate the first terminal device to send a reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the method further includes: sending, by the first terminal device, the reference signal to the second terminal device.

Optionally, the method further includes: receiving, by the first terminal device, a measurement result and indication information of the first unicast connection from the second terminal device, where the measurement result is a result obtained by the second terminal device by measuring the reference signal on the first unicast connection.

According to an eighth aspect, a communication method is provided. The method includes: sending, by a first terminal device, configuration information to a second terminal device, where the configuration information includes a configuration of a unicast connection, and the unicast connection is a unicast connection established by the first terminal device and the second terminal device on a sidelink; and receiving, by the first terminal device, a configuration failure message sent by the second terminal device.

According to the communication method in this embodiment of this application, when failing to configure the unicast connection, the second terminal device directly sends the configuration failure message to the first terminal device. This can improve efficiency of configuring the unicast connection.

Optionally, before the sending, by a first terminal device, configuration information to a second terminal device, the method further includes: receiving, by the first terminal device, the configuration information sent by a network device.

Optionally, the method further includes: sending, by the first terminal device, configuration failure indication information to the network device, where the configuration failure indication information is used to indicate that the second terminal device fails to configure the unicast connection.

According to the communication method in this embodiment of this application, when the second terminal device fails to configure the unicast connection, the first terminal device sends the configuration failure indication information to the network device, so that the network device can directly learn that the second terminal device fails to configure the unicast connection. This can improve efficiency of configuring the unicast connection.

According to a ninth aspect, a communications apparatus is provided. The communications apparatus includes a processor. The processor is coupled to a memory, and may be configured to execute an instruction in the memory, to implement the method in any one of the foregoing aspects and the possible implementations of the foregoing aspects.

Optionally, the communications apparatus further includes a communications interface, and the processor is coupled to the communications interface.

In an implementation, the communications apparatus is a first terminal device. When the communications apparatus is the first terminal device, the communications interface may be a transceiver, or an input/output interface.

In another implementation, the communications apparatus is a chip disposed in the first terminal device. When the communications apparatus is the chip disposed in the first terminal device, the communications interface may be an input/output interface of the chip.

Optionally, the transceiver may be a transceiver circuit. Optionally, the input/output interface may be an input/output circuit.

In another implementation, the communications apparatus may alternatively be the first terminal device in any one of the foregoing implementations, to implement a step or a function of the first terminal device in any one of the foregoing implementations.

In an implementation, the communications apparatus is a second terminal device. When the communications apparatus is the second terminal device, the communications interface may be a transceiver, or an input/output interface.

In another implementation, the communications apparatus is a chip disposed in the second terminal device. When the communications apparatus is the chip disposed in the second terminal device, the communications interface may be an input/output interface of the chip.

Optionally, the transceiver may be a transceiver circuit. Optionally, the input/output interface may be an input/output circuit.

In another implementation, the communications apparatus may alternatively be the second terminal device in any one of the foregoing implementations, to implement a step or a function of the second terminal device in any one of the foregoing implementations.

In an implementation, the communications apparatus is a network device. When the communications apparatus is the network device, the communications interface may be a transceiver, or an input/output interface.

In another implementation, the communications apparatus is a chip disposed in the network device. When the communications apparatus is the chip disposed in the network device, the communications interface may be an input/output interface of the chip.

Optionally, the transceiver may be a transceiver circuit. Optionally, the input/output interface may be an input/output circuit.

In another implementation, the communications apparatus may alternatively be the network device in any one of the foregoing implementations, to implement a step or a function of the network device in any one of the foregoing implementations.

For example, the communications apparatus may include a receiving unit and a sending unit. For example, the sending unit may be a transmitting machine, and the receiving unit may be a receiving machine. In another implementation, for example, the sending unit and the receiving unit in the communications apparatus in this application may be implemented by a same module. For example, a transceiver circuit module is used to implement functions of the sending unit and the receiving unit. The communications apparatus may further include a processing unit, and the processing unit may be a processor. The communications apparatus may further include a storage unit, and the storage unit may be a memory. The storage unit is configured to store an instruction, and the processing unit executes the instruction stored in the storage unit, to enable the communications apparatus to perform the method in any one of the foregoing aspects and the optional implementations of the foregoing aspects. When the processing unit is a chip in the communications apparatus, the processing unit may be a processor, and the receiving unit/sending unit may be an input/output interface, a pin, a circuit, or the like. The processing unit executes the instruction stored in the storage unit, to enable the communications apparatus to perform the method in any one of the foregoing aspects and the optional implementations of the foregoing aspects. The storage unit may be a storage unit (for example, a register or a cache) in the chip, or may be a storage unit (for example, a read-only memory or a random access memory) that is inside the communications apparatus and that is located outside the chip.

According to a tenth aspect, a processor is provided. The processor includes an input circuit, an output circuit, and a processing circuit. The processing circuit is configured to receive a signal by using the input circuit, and transmit a signal by using the output circuit, to enable the processor to perform the method in any aspect or any possible implementation of any aspect.

In a specific implementation process, the processor may be a chip, the input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to and transmitted by, for example, but not limited to, a transmitter, the input circuit and the output circuit may be a same circuit, and the circuit is used as the input circuit and the output circuit at different moments. Specific implementations of the processor and various circuits are not limited in this embodiment of this application.

According to an eleventh aspect, a processing apparatus is provided. The processing apparatus includes a processor, and may further include a memory. The processor is configured to: read an instruction stored in the memory, receive a signal by using a receiver, and transmit a signal by using a transmitter, to perform the method in any aspect and or any possible implementation of any aspect.

Optionally, there are one or more processors and one or more memories.

Optionally, the memory may be integrated with the processor, or the memory and the processor are separately disposed.

In a specific implementation process, the memory may be a non-transitory memory, for example, a read-only memory (read only memory, ROM). The memory and the processor may be integrated on a same chip, or may be separately disposed on different chips. A type of the memory and a manner of disposing the memory and the processor are not limited in this embodiment of this application.

The processing apparatus in the eleventh aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (which may also be referred to as code or an instruction). When the computer program is run, a computer is enabled to perform the method in any aspect or any possible implementation of any aspect.

According to a thirteenth aspect, a computer-readable medium is provided. The computer-readable medium stores a computer program (which may also be referred to as code or an instruction). When the computer program is run on a computer, the computer is enabled to perform the method in any aspect or any possible implementation of any aspect.

According to a fourteenth aspect, a communications system is provided. The communications system includes any one or more of the following: the foregoing network device, the foregoing first terminal device, and the foregoing second terminal device.

DETAILED DESCRIPTION OF ILLUSTRATIVE EMBODIMENTS

Figure 1:
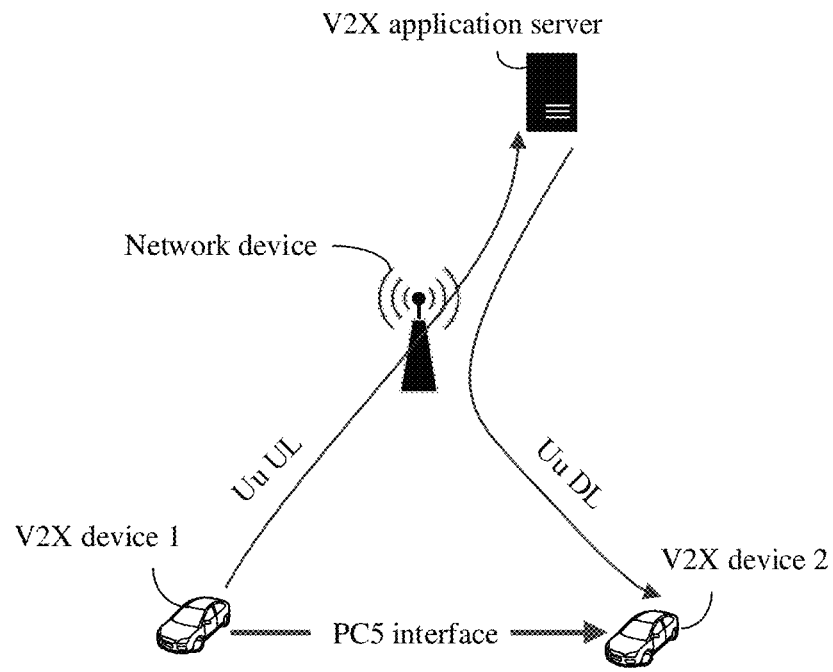
FIG. 1 is a schematic diagram of an application scenario according to an embodiment of this application.

The following describes technical solutions of this application with reference to the accompanying drawings.

The technical solutions of the embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communications apparatus, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile communications network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, or may be a NodeB (NB) in the wideband code division multiple access (WCDMA) system, or may be an evolved NodeB (eNB or eNodeB) in the LTE system, or may be a radio controller in a scenario of a cloud radio access network (CRAN). Alternatively, the network device may be a relay node, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry an instruction and/or data.

The embodiments of this application may be applied to an internet of things system, for example, a vehicle to everything (V2X) system. V2X provides vehicle information by using sensors installed on vehicles, vehicle-mounted terminals, or the like, and implements vehicle-to-vehicle communication, vehicle-to-pedestrian communication, vehicle-to-roadside-infrastructure communication, and vehicle-to-network communication through various communications technologies.

FIG. 1 is an example diagram of a system architecture to which the embodiments of this application are applied. As shown in FIG. 1, a communications system includes a V2X application server, V2X devices (including a V2X device 1 and a V2X device 2), and a network device. The V2X devices communicate with each other through a PC5 interface. A communication link between the V2X devices is defined as a sidelink (SL). Communication between the V2X device and the V2X application server needs to be forwarded by the network device. For example, for uplink, a transmit end V2X device sends V2X data to the network device through a Uu interface, the network device sends the data to the V2X application server for processing, and then, the V2X application server delivers the data to a receive end V2X device; for downlink, the V2X application server sends V2X data to the network device, and the network device sends the V2X data to a V2X device through the Uu interface.

It should be understood that the V2X device in FIG. 1 may be an internet of things device such as UE.

It should be further understood that an arrow direction in FIG. 1 is merely used to describe an example of the V2X device 1, and constitutes no limitation on this embodiment of this application. Actually, communication between the V2X device 1 and the V2X device 2 may alternatively be bidirectional, and the V2X device 2 may also perform uplink communication with the network device. This is not specifically limited.

Figure 2:
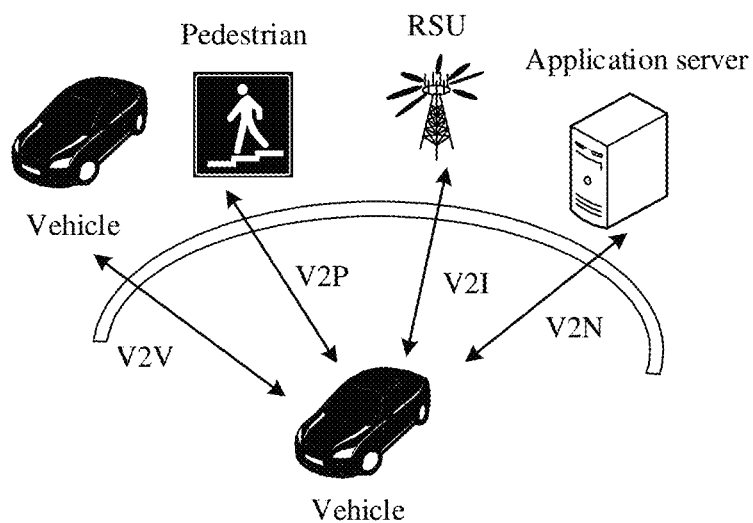
FIG. 2 is a schematic diagram of a V2X service in the prior art.

For example, a V2X service shown in FIG. 2 may specifically include three application requirements: V2V (the internet of vehicles), V2P (vehicle-to-pedestrian communication), and V2I/N (vehicle to infrastructure/network or base station communication), as shown in FIG. 2. V2V refers to LTE-based vehicle-to-vehicle communication. V2P refers to LTE-based vehicle-to-pedestrian (including pedestrians, cyclists, drivers, or passengers) communication. V2I refers to LTE-based vehicle-to-roadside-unit (RSU) communication. In addition, V2I may further include V2N. V2N refers to LTE-based vehicle-to-base-station/network communication, as shown in FIG. 2.

For ease of understanding, the following first describes related terms in this specification.

1. Centralized Scheduling Transmission Mode (which May Also be Referred to as a Mode 3)

An LTE system is a current mainstream wireless communications technology, and a related standard is formulated for a feature and a transmission requirement of a V2X service, to support LTE-based V2X communication. In V2X communication based on the LTE system, sidelink communication is a main communication manner. In the sidelink communication, data transmitted between terminal devices may not be forwarded by a network device. The sidelink communication mainly includes two transmission modes: the centralized scheduling transmission mode (which may also be referred to as the mode 3) and a distributed transmission mode (which may also be referred to as a mode 4).

Centralized scheduling transmission mode (which may also be referred to as the mode 3): In this mode, before sending data, a terminal device needs to apply to the network device for a resource, and sends V2X service data based on the resource allocated by the network device. Because resources of terminal devices are centrally allocated by the network device, a same resource is not allocated to adjacent terminal devices. Therefore, the centralized transmission mode can ensure better transmission reliability. However, signaling needs to be exchanged between the terminal device and the network device each time. As a result, a transmission delay of sending data in the centralized scheduling transmission mode is longer than that in the distributed transmission mode.

It should be noted that, in NR, V2X in this mode may also be referred to as a mode 1.

2. Distributed Transmission Mode (which May Also be Referred to as the Mode 4)

Distributed transmission mode (which may also be referred to as the mode 4): In a scenario of network coverage, the network device configures a resource pool for the terminal device by using a SIB message or dedicated radio resource control (Dedicated RRC) signaling. When sending V2X data, the terminal device may send the data by using at least some resources independently obtained from the resource pool through random selection, or obtained based on a listening reservation mechanism or a partial listening reservation mechanism. In a scenario without network coverage, the terminal device sends data by using at least some resources independently obtained from a resource pool in pre-configuration information. The pre-configuration information may be a resource pool that is configured in the terminal when the terminal is delivered from a factory, or may be information that is pre-configured by the network device and that is stored in the terminal. Because the terminal device independently selects a resource, different terminal devices may select a same resource to send data. Consequently, a transmission collision may occur.

It should be noted that, in NR, V2X in this mode may also be referred to as a mode 2.

3. Buffer Status Report (BSR)

When the UE requests an uplink resource from the network device by using an SR, only whether the UE needs to send uplink data is indicated, but an amount of the to-be-sent uplink data is not indicated. The UE needs to send a BSR to the network device, to indicate the amount of data that is in an uplink buffer of the UE and that needs to be sent, so that the network device determines a size of the uplink resource allocated to the UE.

4. Logic Channel Group (LCG)

An LCG is a group of one or more logic channels. Each logic channel group is bound with one buffer size, to reduce a quantity of information bits transmitted over an air interface. The buffer size carries one of 64 index values ranging from 0 to 63. Each index value corresponds to a byte quantity of a different range.

It should be understood that the buffer size is not an amount of all to-be-transmitted data of the UE or a quantity of to-be-transmitted data bytes of a logic channel, but corresponds to an amount of to-be-transmitted data of a logic channel group. Each logic channel group is bound with one buffer size. When a logic channel group of the UE has data needing to be sent, a buffer size of the logic channel group may be reported.

In the prior art, LTE V2X supports only a broadcast service, and data of different V2X services can be transmitted. In an NR technology, more communication types are supported, for example, broadcast transmission, unicast transmission, or multicast transmission. However, according to an existing unicast communication mechanism, to be specific, a procedure in which a terminal device initiates establishment of direct communication unicast transmission in a D2D technology, there is a unicast connection between two terminal devices. When data of a plurality of V2X services is transmitted between the two terminal devices, data of different V2X services is multiplexed into one set of logic channels, that is, the data of different V2X services is multiplexed into one MAC PDU for sending. As a result, a receive end terminal device cannot identify the data of different V2X services.

In view of this, this application provides a unicast transmission method and a communications apparatus. During V2X unicast communication, a transmit end terminal device sends first data, information about a destination identifier, and information about a target service identifier, to ensure that a receive end terminal device can distinguish between data of different V2X services by using the information about the destination identifier and the target service identifier, so as to meet requirements of the different services. In this way, unicast transmission of data of different services or different service types between two terminal devices is implemented.

The following describes in detail the embodiments of this application with reference to specific examples. It should be noted that the descriptions are merely intended to help a person skilled in the art better understand the embodiments of this application, but are not intended to limit the scope of the embodiments of this application.

It should be understood that, in the embodiments of this application, "first", "second", and the like are merely intended to indicate different objects, and do not indicate another limitation on the indicated objects.

It should be further understood that, in the embodiments of this application, the "service" may also represent a "service type".

Figure 3:
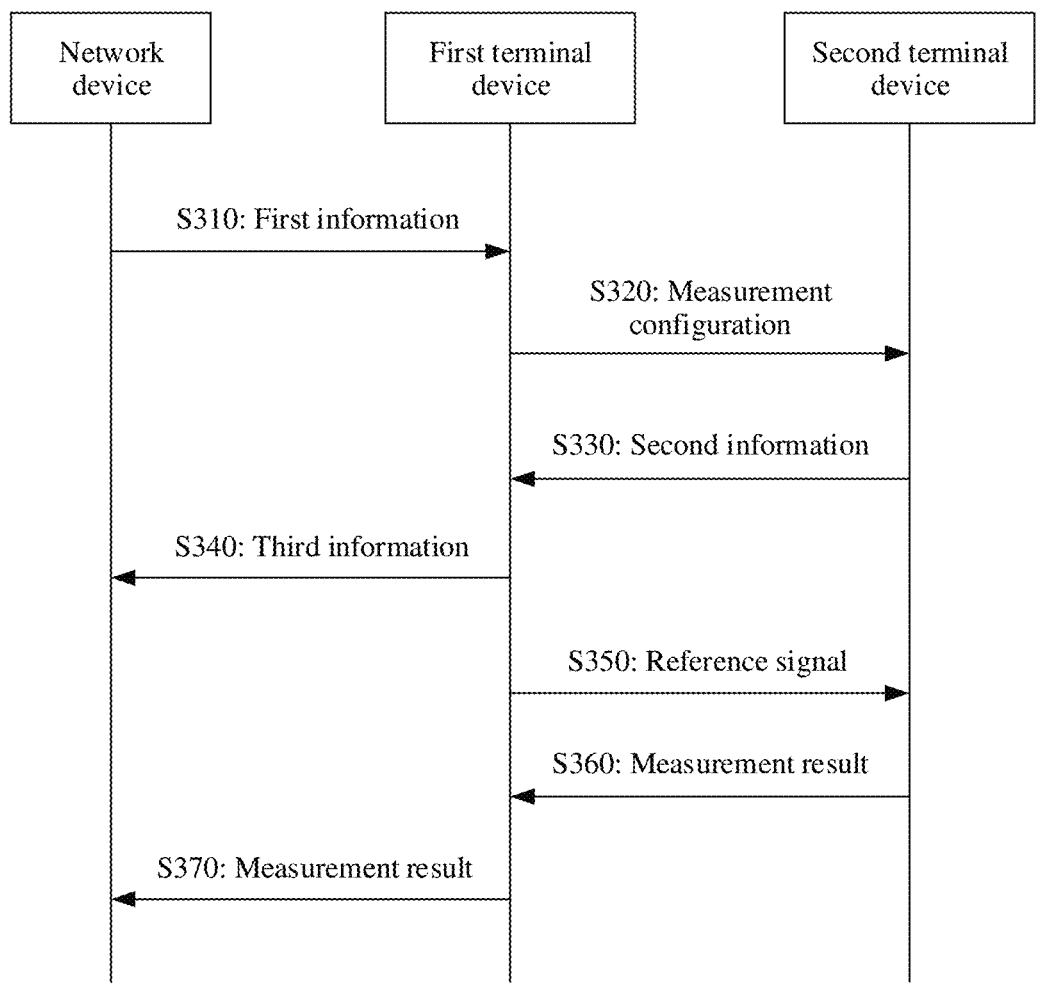
FIG. 3 is a schematic diagram of a communication method according to an embodiment of this application.

FIG. 3 is a schematic interaction diagram of a communication method according to an embodiment of this application. The communication method 300 in FIG. 3 may be applied to the network architecture in FIG. 1. The communication method 300 shown in FIG. 3 may be applied to a scenario of unicast communication of a V2X service. The communication method in FIG. 3 includes the following steps.

S310: A network device sends first information. Correspondingly, a first terminal device receives the first information.

The first information may include a reference signal configuration of a first unicast connection, the reference signal configuration is used by the first terminal device to send a reference signal to a second terminal device, and the first unicast connection is a unicast connection established by the first terminal device and the second terminal device on a sidelink.

Optionally, the reference signal configuration may include first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

For example, the first parameter configuration may include at least one of the following configurations used by the first terminal device to send the reference signal: a time-frequency domain position parameter, a sending periodicity, an index of the reference signal, and a frequency corresponding to the reference signal. The time-frequency domain position parameter is used to indicate a position of a time-frequency domain resource for sending the reference signal.

In a possible implementation, the first information includes the first indication information. After receiving the first indication information, the first terminal device starts to send the reference signal to the second terminal device. A manner of sending the reference signal is fixed. "Fixed" may be understood as that the position of the time-frequency domain resource for sending the reference signal may be deduced based on a position of a time-frequency domain resource for sending data, or may be understood as that the position of the time-frequency domain resource for sending the reference signal is fixed, and so on. This is not limited in this application.

In another possible implementation, the first information includes the first parameter configuration, and after receiving the first parameter configuration, the first terminal device sends the reference signal to the second terminal device based on the first parameter configuration.

In another possible implementation, the first information includes the first indication information and the first parameter configuration, and the first indication information is used to indicate the first terminal device to send the reference signal to the second terminal device based on the first parameter configuration.

In another possible implementation, the first information may include an identifier of the first unicast connection.

For example, when the first terminal device has a plurality of unicast connections, the first terminal device may determine the first unicast connection based on the identifier of the first unicast connection, to determine that the reference signal configuration is a configuration of the first unicast connection.

Optionally, the identifier of the first unicast connection may be a second identifier or a combination of a first identifier and a second identifier, where the first identifier is an identifier allocated by the first terminal device to the first unicast connection, and the second identifier is an identifier allocated by the second terminal device to the first unicast connection.

In another possible implementation, the first information may further include a measurement configuration of the first unicast connection, and the measurement configuration is used by the second terminal device to perform measurement.

Optionally, the measurement configuration may include second indication information and/or a second parameter configuration, the second indication information is used to indicate the second terminal device to perform measurement, and the second parameter configuration includes a parameter configuration used by the second terminal device to perform measurement.

Optionally, the second parameter configuration may include one or more of the following: the third parameter configuration, a measurement quantity configuration, a measurement report configuration, or a measurement identifier. The third parameter configuration is used by the second terminal device to receive the reference signal.

The measurement quantity configuration may include a measurement quantity that needs to be measured by the second terminal device based on the reference signal, such as reference signal received power (RSRP), reference signal received quality (RSRQ), or a received signal strength indicator (RSSI).

The measurement report configuration may be a configuration of a measurement event, or may be periodic reporting of a measurement result and a reporting periodicity of the measurement result. When a trigger condition of the measurement event is satisfied, or based on the measurement periodicity, the second terminal device sends the measurement result to the first terminal device.

The measurement identifier is associated with the report configuration and the measurement quantity configuration of the unicast connection. The network device may centrally allocate measurement identifiers to different measurement configurations of different unicast connections of the first terminal device. In other words, the measurement identifier may uniquely identify one measurement configuration across the unicast connections of the first terminal device. This may also be understood as that each measurement configuration of the different unicast connections of the first terminal device corresponds to one unique measurement identifier. Optionally, the network device may alternatively allocate a measurement identifier to a measurement configuration of each different unicast connection of the first terminal device. In other words, the measurement identifier uniquely identifies one measurement configuration of only one unicast connection. This may be understood as that measurement identifiers of different unicast connections of the first terminal device may be the same.

Optionally, the first parameter configuration generated by the network device for the first terminal device and the third parameter configuration generated by the network device for the second terminal device may be a same parameter configuration. In other words, the first parameter configuration and the third parameter configuration may be a same parameter configuration, and the parameter configuration is applicable to both the first terminal device and the second terminal device. In other words, the network device sends only one parameter to the first terminal device to indicate the parameter configuration of the reference signal, and the parameter is applicable to both the first terminal device and the second terminal device. Alternatively, the first parameter configuration and the third parameter configuration may be two independent parameter configurations, the first parameter configuration is applicable to the first terminal device, and the third parameter configuration is applicable to the second terminal device. This is not limited in this embodiment of this application.

In this embodiment of this application, before S310, the network device may further obtain a measurement capability allocated by the first terminal device to the first unicast connection and/or a measurement capability allocated by the second terminal device to the first unicast connection.

The measurement capability may include at least one of the following: a quantity of measurement frequencies, a quantity of measurement identifiers, or measurement frequency information.

Optionally, the network device may determine the first information based on the measurement capability allocated by the first terminal device to the first unicast connection and/or the measurement capability allocated by the second terminal device to the first unicast connection.

In this embodiment of this application, in a possible implementation, the first terminal device and the second terminal device may be connected to different network devices, or the first terminal device is connected to a network, and the second terminal device is in an idle state.

In this case, the network device configures only unidirectional measurement on the first unicast connection for the first terminal device, that is, configures only a case in which the first terminal device sends the reference signal and the second terminal device performs measurement.

A case in which the second terminal device sends a reference signal and the first terminal device performs measurement may be configured by a network device connected to the second terminal device.

S320: The first terminal device sends the measurement configuration. Correspondingly, the second terminal device receives the measurement configuration.

The measurement configuration may be used by the second terminal device to perform measurement.

In a possible implementation, when the first information further includes the measurement configuration of the first unicast connection, the first terminal device may send the measurement configuration to the second terminal device.

Optionally, the measurement configuration may include the second indication information and/or the second parameter configuration, the second indication information may be used to indicate the second terminal device to perform measurement, the second parameter configuration includes the parameter configuration used by the second terminal device to perform measurement, and the second parameter configuration may include one or more of the following: the third parameter configuration, the measurement quantity configuration, the measurement report configuration, or the measurement identifier.

The third parameter configuration is used by the second terminal device to receive the reference signal. The third parameter configuration may be the first parameter configuration received by the first terminal device from the network device.

Optionally, the measurement configuration may include the identifier of the first unicast connection, and the identifier is used to indicate that the measurement configuration is the configuration of the first unicast connection.

Optionally, the second terminal device may obtain a measurement configuration pre-configured by the network device or defined in a protocol. This is not limited in this embodiment of this application. In this case, the second terminal device starts measurement after receiving the second indication information from the first terminal device.

S330: The second terminal device sends second information. Correspondingly, the first terminal device receives the second information.

The second information is used to indicate that the second terminal device successfully receives the measurement configuration. This step is optional.

S340: The first terminal device sends third information. Correspondingly, the network device receives the third information.

The third information may be used to indicate that the first terminal device successfully completes configuration, specifically including successfully receiving and completing the reference signal configuration.

Alternatively, the third information may be used to indicate that the second terminal device successfully completes configuration, specifically including successfully receiving and completing the measurement configuration.

Alternatively, the third information may be used to indicate that the first terminal device successfully completes configuration, and that the second terminal device successfully completes configuration.

S350: The first terminal device sends the reference signal on the sidelink based on the reference signal configuration. Correspondingly, the second terminal device receives the reference signal on the sidelink.

Optionally, the second terminal device may perform measurement on the first unicast connection based on the reference signal and/or the measurement configuration.

S360: The second terminal device sends the measurement result. Correspondingly, the first terminal device receives the measurement result.

The measurement result is a result obtained by the second terminal device by performing measurement on the first unicast connection.

Optionally, the measurement result may include the corresponding measurement identifier.

S370: The first terminal device sends the measurement result to the network device. Correspondingly, the network device receives the measurement result.

Optionally, the first terminal device may further send the identifier of the unicast connection corresponding to the measurement result to the network device, where the identifier of the first unicast connection is the combination of the first identifier and the second identifier, the first identifier is the identifier allocated by the first device to the first unicast connection, and the second identifier is the identifier allocated by the second device to the first unicast connection.

It should be noted that a connection status of the second terminal device is not limited in the embodiment of the method 300 in FIG. 3. In other words, the second terminal device and the first terminal device may be connected to a same network device, the second terminal device and the first terminal device may be connected to different network devices, or the second terminal device may be in the idle state or an inactive state. This is not limited in this embodiment of this application.

Figure 4:
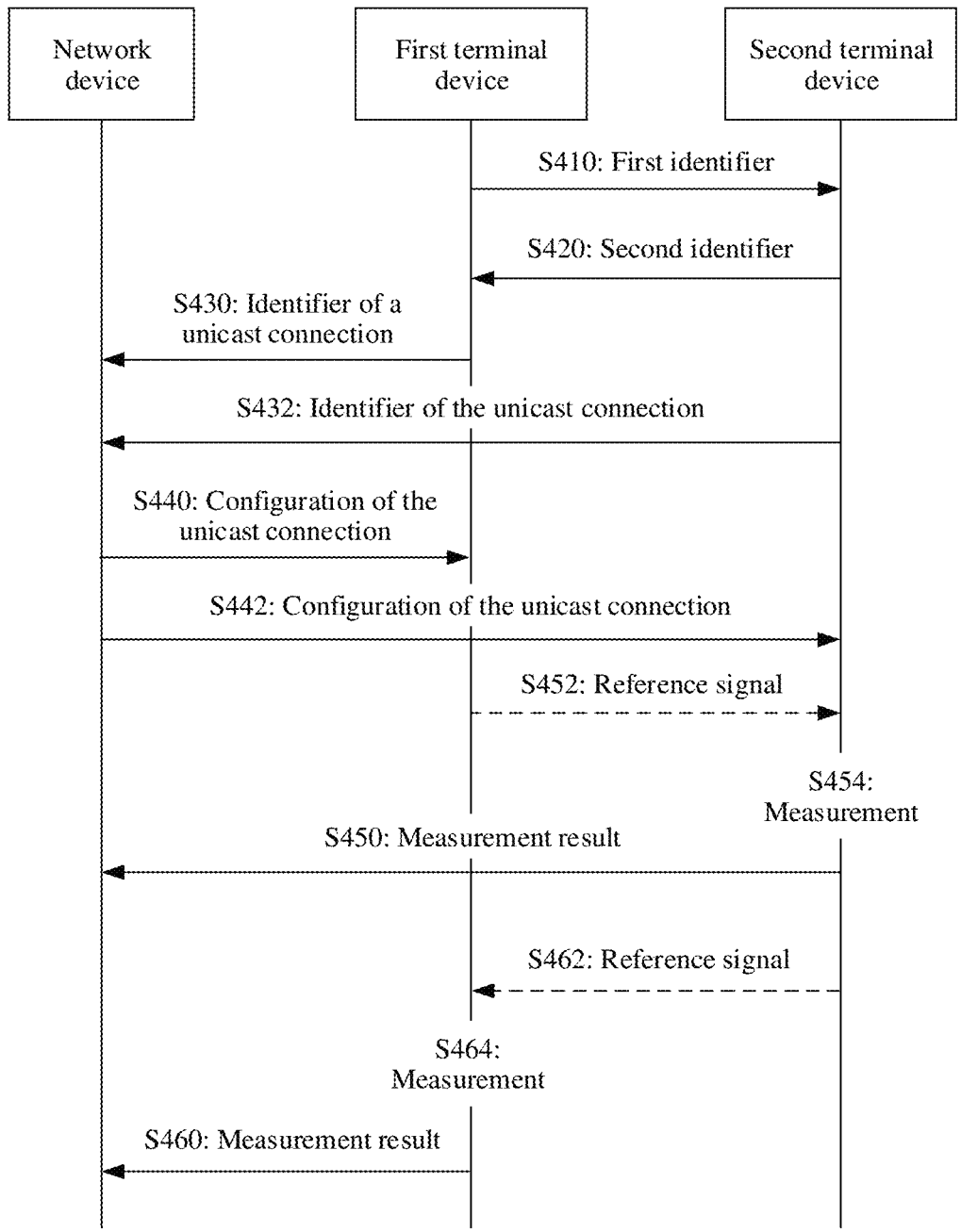
FIG. 4 is a schematic diagram of a communication method according to another embodiment of this application.

With reference to FIG. 4, the following describes in detail a case in which the first terminal device and the second terminal device are connected to a same network device.

FIG. 4 is a schematic interaction diagram of a communication method according to an embodiment of this application. The communication method 400 in FIG. 4 may be applied to the network architecture in FIG. 1. The communication method 400 shown in FIG. 4 may be applied to a scenario of unicast communication of a V2X service. The communication method in FIG. 4 includes the following steps.

S410: A first terminal device sends a first identifier to a second terminal device.

Optionally, the first identifier is an identifier allocated by the first device to a first unicast connection. The first unicast connection may be a unicast connection established by the first terminal device and the second terminal device on a sidelink.

In this embodiment of this application, the two terminal devices may exchange identifiers allocated by the two terminal devices to the unicast connection.

For example, when sending the first identifier to the second terminal device, the first terminal device may further send, to the second terminal device, information about a cell to which the first terminal device is currently connected. The information about the cell may be a physical cell identifier (PCI) or a cell global identification (CGI).

Optionally, the first identifier may include the information about the cell to which the first terminal device is currently connected.

Alternatively, the first terminal device may send, to the second terminal device through another message (or other information), the information about the cell to which the first terminal device is currently connected. This is not limited in this embodiment of this application.

After receiving the information about the cell, the second terminal device may determine whether the first terminal device is connected to a same network device or a same cell as the second terminal device.

S420: The second terminal device sends a second identifier to the first terminal device.

Optionally, the second identifier is an identifier allocated by the second device to the first unicast connection. The first unicast connection may be a unicast connection established by the first terminal device and the second terminal device on the sidelink.

Similarly, when sending the second identifier to the first terminal device, the second terminal device may also send, to the first terminal device, information about a cell to which the second terminal device is currently connected. The information about the cell may be a physical cell identifier (PCI) or a cell global identification (CGI).

Optionally, the second identifier may include the information about the cell to which the second terminal device is currently connected.

Alternatively, the second terminal device may send, to the first terminal device through another message (or other information), the information about the cell to which the second terminal device is currently connected. This is not limited in this embodiment of this application.

After receiving the information about the cell, the first terminal device may determine whether the second terminal device is connected to a same network device or a same cell as the first terminal device.

It should be noted that, in the foregoing steps, if the first terminal device and the second terminal device determine, through the foregoing information exchange, that the first terminal device and the second terminal device are connected to a same network device, the following S430 and S432 may be performed to send an identifier of the unicast connection to the network device.

Alternatively, each terminal device sends, to the network device, an identifier allocated by the terminal device to the first unicast connection, and the network device determines two terminal devices that are connected to a same network device or a same cell and that are in terminal devices that perform unicast transmission.

For example, the first terminal device sends the first identifier to the network device, and the second terminal device sends the second identifier to the network device. The network device determines that the first terminal device and the second terminal device are two terminal devices connected to a same network device or a same cell.

If the first terminal device and the second terminal device determine, through the foregoing information exchange, that the first terminal device and the second terminal device are not connected to a same network device, the method 300 in FIG. 3 may be performed. Optionally, if the second terminal device is in an idle state or an inactive state, the method 300 in FIG. 3 may also be performed.

S430: The first terminal device sends an identifier of the unicast connection to the network device.

Optionally, the identifier of the unicast connection may be a combination of the first identifier and the second identifier.

For example, if the identifier allocated by the first terminal device to the first unicast connection is 1, and the identifier allocated by the second terminal device to the first unicast connection is 2, the identifier, of the first unicast connection, that is reported by the first terminal device to the network device may be <1, 2>.

S432: The second terminal device sends an identifier of the unicast connection to the network device.

Optionally, the identifier of the unicast connection may be a combination of the first identifier and the second identifier.

For example, if the identifier allocated by the first terminal device to the first unicast connection is 1, and the identifier allocated by the second terminal device to the first unicast connection is 2, the identifier, of the first unicast connection, that is reported by the second terminal device to the network device may be <2, 1>.

Optionally, the identifier, of the first unicast connection, that is reported by the first terminal device to the network device may alternatively be the same as the identifier, of the first unicast connection, that is reported by the second terminal device to the network device. For example, the identifier, of the unicast connection, that is sent by the first terminal device to the network device and the identifier, of the unicast connection, that is sent by the second terminal device to the network device may both be <1, 2> or <2, 1>.

It should be understood that the foregoing method for identifying the unicast connection is merely an example rather than a limitation. In this embodiment of this application, another identifier or identifier combination may also be used to identify the unicast connection. This is not limited in this embodiment of this application.

Optionally, after the network device receives the identifier, of the unicast connection, that is sent by the first terminal device and the identifier, of the unicast connection, that is sent by the second terminal device, the network device may determine whether the two terminal devices have at least one same unicast connection.

For example, the network device may learn that <1, 2> and <2, 1> indicate a same unicast connection (the first unicast connection), and learn that two terminal devices of the unicast connection are the first terminal device and the second terminal device.

It should be noted that, after the network device receives the identifier, of the unicast connection, that is sent by the first terminal device, if the network device does not find, through matching, a terminal device that has a same unicast connection as the first terminal device, the network device may query an adjacent network device.

Specifically, the network device may send the identifier of the unicast connection to the adjacent network device. The adjacent network device receives the identifier of the unicast connection, and returns an acknowledgment message if finding a terminal device that has a same unicast connection as the first terminal device, and in this case, a step in the method 300 in FIG. 3 may be performed; otherwise, the adjacent network device may not reply with a message, or the adjacent network device may reply with a failure message.

S440: The network device sends a configuration of the unicast connection to the first terminal device.

The configuration of the unicast connection may include a reference signal configuration of the first unicast connection, the reference signal configuration is used by the first terminal device to send a reference signal to the second terminal device, and the first unicast connection is a unicast connection established by the first terminal device and the second terminal device on the sidelink.

Optionally, the reference signal configuration may include first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

For example, the first parameter configuration may include at least one of the following configurations used by the first terminal device to send the reference signal: a time-frequency domain position parameter, a sending periodicity, an index of the reference signal, and a frequency corresponding to the reference signal. The time-frequency domain position parameter is used to indicate a position of a time-frequency domain resource for sending the reference signal.

In another possible implementation, the configuration of the unicast connection may include the identifier of the first unicast connection.

For example, when the first terminal device has a plurality of unicast connections, the first terminal device may determine the first unicast connection based on the identifier of the first unicast connection, to determine that the reference signal configuration is the configuration of the first unicast connection.

Optionally, the identifier of the first unicast connection may be the second identifier or the combination of the first identifier and the second identifier, where the first identifier is the identifier allocated by the first device to the first unicast connection, and the second identifier is the identifier allocated by the second device to the first unicast connection.

In another possible implementation, the configuration of the unicast connection may further include a measurement configuration of the first unicast connection, and the measurement configuration is used by the first terminal device to perform measurement.

In other words, when the first terminal device and the second terminal device are connected to a same network device, the network device may directly send, to the first terminal device, the measurement configuration used by the first terminal device to perform measurement, and the measurement configuration does not need to be forwarded by the second terminal device.

Optionally, the measurement configuration may include second indication information and/or a second parameter configuration, the second indication information is used to indicate the first terminal device to perform measurement, and the second parameter configuration includes a parameter configuration used by the first terminal device to perform measurement.

Optionally, the second parameter configuration may include one or more of the following: the third parameter configuration, a measurement quantity configuration, a measurement report configuration, or a measurement identifier. The third parameter configuration is used by the first terminal device to receive the reference signal.

The measurement quantity configuration may include a measurement quantity that needs to be measured by the first terminal device based on the reference signal, such as reference signal received power (RSRP), reference signal received quality (RSRQ), or a received signal strength indicator (RSSI).

The measurement report configuration may be a configuration of a measurement event, or may be periodic reporting of a measurement result and a reporting periodicity of the measurement result.

The measurement identifier is associated with the report configuration and the measurement quantity configuration of the unicast connection. The base station may centrally allocate measurement identifiers to different measurement configurations of different unicast connections of the first terminal device. In other words, the measurement identifier may uniquely identify one measurement configuration across the unicast connections of the first terminal device. This may also be understood as that each measurement configuration of the different unicast connections of the first terminal device corresponds to one unique measurement identifier. Optionally, the base station may alternatively allocate a measurement identifier to a measurement configuration of each different unicast connection of the first terminal device. In other words, the measurement identifier uniquely identifies one measurement configuration of only one unicast connection. This may be understood as that measurement identifiers of different unicast connections of the first terminal device may be the same.

S442: The network device sends a configuration of the unicast connection to the second terminal device.

The configuration of the unicast connection may include a reference signal configuration of the first unicast connection, and the reference signal configuration is used by the second terminal device to send a reference signal to the first terminal device.

Optionally, the configuration of the unicast connection may include the identifier of the first unicast connection.

In another possible implementation, the configuration of the unicast connection may further include a measurement configuration of the first unicast connection, and the measurement configuration is used by the second terminal device to perform measurement.

In other words, when the first terminal device and the second terminal device are connected to a same network device, the network device may directly send, to the second terminal device, the measurement configuration used by the second terminal device to perform measurement, and the measurement configuration does not need to be forwarded by the first terminal device.

For descriptions of the reference signal configuration and the measurement configuration in S442 herein, refer to the foregoing descriptions in S440.

It can be learned from the foregoing embodiment that in the method 400, the network device respectively generates the configurations of the unicast connection for the first terminal device and the second terminal device, and directly sends the generated configurations of the unicast connection to the first terminal device and the second terminal device respectively.

For example, the network device sends the reference signal configuration to the first terminal device, and sends the measurement configuration to the second terminal device, so that the second terminal device measures the reference signal sent by the first terminal device. In addition, the network device sends the reference signal configuration to the second terminal device, and sends the measurement configuration to the first terminal device, so that the first terminal device measures the reference signal sent by the second terminal device.

S452: The first terminal device sends the reference signal to the second terminal device.

Optionally, the first terminal device may send the reference signal to the second terminal device based on the reference signal configuration received in S440.

S454: The second terminal device performs measurement on the unicast connection.

Optionally, the second terminal device may measure the reference signal on the first unicast connection based on the measurement configuration received in S442.

S450: The second terminal device reports a measurement result to the network device.

Optionally, the network device may pre-configure the measurement event, or may pre-configure the reporting periodicity of the measurement result. In this way, the second terminal device may report the measurement result to the network device when a trigger condition of the measurement event is satisfied, or the second terminal device may report the measurement result to the network device based on the reporting periodicity.

Optionally, the measurement result may include the corresponding measurement identifier.

Optionally, the measurement identifier may be the identifier of the unicast connection, or may be an index or a measurement ID.

For example, the second terminal device may further send the identifier of the first unicast connection corresponding to the measurement result to the network device, where the identifier of the first unicast connection is the combination of the first identifier and the second identifier, the first identifier is the identifier allocated by the first device to the first unicast connection, and the second identifier is the identifier allocated by the second device to the first unicast connection.

For another example, the index allocated by the network device and the terminal device to the unicast connection may alternatively be a same unicast connection list maintained by the network device and the terminal device. If the index is allocated by the network device, the index may be indicated in a unicast configuration sent by the network device to the terminal device. If the index is allocated by the terminal device, the index may be further indicated when the terminal device sends information about the unicast connection to the network device. If the index is a unicast connection list, the index may be determined by the network device and the terminal device.

In a solution of the measurement ID, when configuring the measurement configuration for the terminal device, the network device needs to indicate a correspondence between the measurement ID and the unicast connection. This means that the measurement ID uniquely identifies one measurement configuration in the entire terminal device. Optionally, the network device may alternatively maintain a list of measurement IDs for each unicast connection. In other words, the measurement ID uniquely identifies one measurement configuration of one unicast connection.

S462: The second terminal device sends the reference signal to the first terminal device.

Optionally, the second terminal device may send the reference signal to the first terminal device based on the reference signal configuration received in S442.

S464: The first terminal device performs measurement on the unicast connection.

Optionally, the first terminal device may measure the reference signal on the first unicast connection based on the measurement configuration received in S440.

S460: The first terminal device reports a measurement result to the network device.

Optionally, the network device may pre-configure the measurement event, or may pre-configure the reporting periodicity of the measurement result. In this way, the first terminal device may report the measurement result to the network device when a trigger condition of the measurement event is satisfied, or the first terminal device may report the measurement result to the network device based on the reporting periodicity.

Optionally, the measurement result may include the corresponding measurement identifier.

Optionally, the first terminal device may further send the identifier of the unicast connection corresponding to the measurement result to the network device, where the identifier of the first unicast connection is the combination of the first identifier and the second identifier, the first identifier is the identifier allocated by the first device to the first unicast connection, and the second identifier is the identifier allocated by the second device to the first unicast connection.

Figure 5:
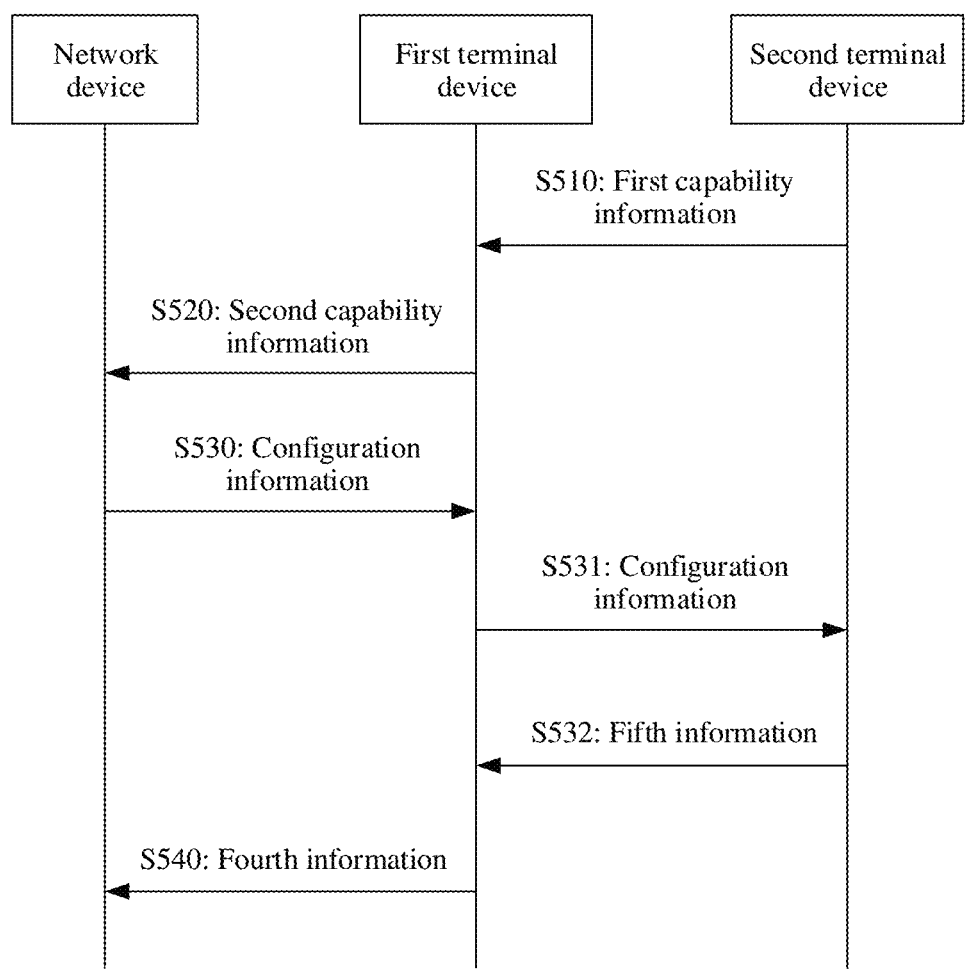
FIG. 5 is a schematic diagram of a communication method according to still another embodiment of this application.

FIG. 5 is a schematic flowchart of a communication method 500 according to an embodiment of this application. As shown in FIG. 5, the communication method 500 includes the following steps.

S510: A second terminal device sends first capability information to a first terminal device. Correspondingly, the first terminal device receives the first capability information.

The first capability information includes a capability that can be allocated by the second terminal device to a unicast connection, and the unicast connection is a unicast connection established by the first terminal device and the second terminal device on a sidelink.

Alternatively, the first capability information includes a capability allocated by the second terminal device to the unicast connection.

It should be noted that the capability that can be allocated by the second terminal device to the unicast connection may be a currently available capability of the second terminal device; or the capability that can be allocated by the second terminal device to the unicast connection may be a total capability of the second terminal device. The capability allocated by the second terminal device to the unicast connection may be a capability that is determined by the second terminal device to be used for the unicast connection.

Similarly, a capability that can be allocated by the first terminal device to the unicast connection may be a currently available capability of the first terminal device; or the capability that can be allocated by the first terminal device to the unicast connection may be a total capability of the first terminal device. A capability allocated by the first terminal device to the unicast connection may be a capability that is determined by the first terminal device to be used for the unicast connection.

In this embodiment of this application, the capability allocated by the second terminal device to the unicast connection may be allocated by the first terminal device; the capability allocated by the second terminal device to the unicast connection may be allocated by the network device; or the capability allocated by the second terminal device to the unicast connection may be allocated by the second terminal device. A specific allocation method may be shown in FIG. 6.

The first capability information of the second terminal device may include one or more candidate capabilities. In other words, the currently available capability of the second terminal device may include one or more candidate capabilities, or the total capability of the second terminal device may include one or more candidate capabilities. Optionally, the candidate capabilities may include one or more of the following: a supported frequency band combination, a supported frequency band, a supported carrier aggregation, a supported duplication function, supported bandwidth, a quantity of supported multiple-input multiple-output (MIMO) layers, a measurement capability, a subcarrier spacing, a modulation and demodulation capability, or maximum power. The measurement capability may include one or more of a quantity of measurement frequencies that can be used for the unicast connection, a quantity of measurement identifiers, or a measurement frequency.

The capability allocated by the second terminal device to the unicast connection is the capability that is determined by the second terminal device to be used for the unicast connection. Optionally, the capability allocated by the second terminal device to the unicast connection may include one or more of the following: a supported frequency band combination, a supported frequency band, a supported carrier aggregation, a supported duplication function, supported bandwidth, a quantity of supported multiple-input multiple-output (MIMO) layers, a measurement capability, a subcarrier spacing, a modulation and demodulation capability, or maximum power. The measurement capability may include one or more of a quantity of measurement frequencies that can be used for the unicast connection, a quantity of measurement identifiers, or a measurement frequency.

In this case, before the receiving, by a first terminal device, first capability information from a second terminal device, the method may further include: sending, by the first terminal device, third capability information to the second terminal device.

The third capability information may include the capability that can be allocated by the first terminal device to the unicast connection, or the capability allocated by the first terminal device to the unicast connection.

To be specific, the second terminal device may allocate a capability to the unicast connection based on the third capability information. In this case, the second terminal device may further send, to the first terminal device, a capability that is selected by the second terminal device and that is of the first terminal device.

Before S510, the first terminal device may further send capability query information to the second terminal device, and the capability query information is used to request the second terminal device to send the first capability information. Optionally, the third capability information may be carried in the query information.

Optionally, the capability query information may further include an identifier of the unicast connection.

For example, when sending the capability query information, the first terminal device may include the identifier of the unicast connection in a MAC PDU header.

Alternatively, when sending the capability query information, the first terminal device may include the identifier of the unicast connection in sidelink control information (SCI).

Alternatively, when sending the capability query information, the first terminal device may divide the identifier of the unicast connection into two parts, where one part is included in the MAC PDU header, and the other part is included in the SCI.

It should be understood that, in this embodiment of this application, the identifier of the unicast connection may alternatively be sent by using another method. This is not limited in this embodiment of this application.

S520: The first terminal device sends second capability information to the network device. Correspondingly, the network device receives the second capability information.

The second capability information may include the capability that can be allocated by the second terminal device to the unicast connection. Alternatively, the second capability information may include the capability allocated by the second terminal device to the unicast connection.

Optionally, if the first capability information includes the capability that can be allocated by the second terminal device to the unicast connection, the first terminal device may determine the second capability information based on capability information of the first terminal device and the first capability information, that is, determine the capability allocated by the second terminal device to the unicast connection.

The capability information of the first terminal device may include the capability that can be allocated by the first terminal device to the unicast connection; or the capability information of the first terminal device may include the capability allocated by the first terminal device to the unicast connection.

Optionally, the second capability information may include the identifier of the unicast connection.

The identifier of the unicast connection may be a combination of a first identifier and a second identifier, the first identifier is an identifier allocated by the first device to the unicast connection, and the second identifier is an identifier allocated by the second device to the unicast connection.

In this embodiment of this application, the first terminal device may alternatively not send the second capability information to the network device, and the first terminal device determines a configuration of the unicast connection.

For example, if the first terminal device is in an idle state, the first terminal device may determine configuration information based on the first capability information and the capability information of the first terminal device, where the configuration information includes the configuration of the unicast connection.

The first terminal device may further configure the unicast connection based on the configuration information.

S530: The network device sends the configuration information. Correspondingly, the first terminal device receives the configuration information.

The configuration information includes the configuration of the unicast connection.

Optionally, before S530, the method may further include: determining, by the network device, the configuration information based on the capability information of the first terminal device and the second capability information, where the configuration information includes the configuration of the unicast connection.

Optionally, the capability information of the first terminal device may include the capability that can be allocated by the first terminal device to the unicast connection. Alternatively, the capability information of the first terminal device may include the capability allocated by the first terminal device to the unicast connection.

Optionally, the configuration information may include one or more of the following: a bearer configuration of the unicast connection, a carrier configuration of the unicast connection, a reference signal configuration of the unicast connection, or a measurement configuration of the unicast connection.

Optionally, the reference signal configuration in the configuration information may be used by the first terminal device to send a reference signal to the second terminal device.

Specifically, the reference signal configuration may include first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the measurement configuration in the configuration information may be used by the second terminal device to perform measurement.

Specifically, the measurement configuration may include second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

In this embodiment of this application, the first terminal device and the second terminal device may perform measurement on the unicast connection based on the reference signal configuration and/or the measurement configuration. For a specific measurement method, refer to the method 300 in FIG. 3. Details are not described herein again.

In this embodiment of this application, the network device generates a configuration for the unicast connection in the following two manners.

Manner 1: The network device generates a configuration only for the first terminal device. In this case, the method 500 may further include S540.

In this case, the network device generates the configuration only for the first terminal device, and a configuration of the second terminal device may be obtained by the second terminal device through broadcast or pre-configuration, or may be obtained by the second terminal device from a network device connected to the second terminal device.

It should be understood that the network device connected to the second terminal device may be a network device the same as the network device connected to the first terminal device, or the network device connected to the second terminal device may be a network device different from the network device connected to the first terminal device. This is not limited in this embodiment of this application.

In this case, the configuration generated by the network device may include only the reference signal configuration.

Optionally, after the network device sends the configuration of the unicast connection to the first terminal device, the method 500 further includes S540.

S540: The first terminal device sends fourth information. Correspondingly, the network device receives the fourth information.

The fourth information may be used to indicate that the configuration of the unicast connection is completed.

Optionally, after the configuration of the unicast connection is completed, the first terminal device performs communication with the second terminal device via the unicast connection based on the configuration information.

Manner 2: The network device generates configurations for the two terminal devices of the unicast connection. In this case, the method 500 may further include S531, S532, and S540.

In this case, the network device generates the configurations for the two terminal devices of the unicast connection.

It should be understood that a network device connected to the second terminal device may be a network device the same as the network device connected to the first terminal device, or the network device connected to the second terminal device may be a network device different from the network device connected to the first terminal device. This is not limited in this embodiment of this application.

In this case, the configuration generated by the network device may include the reference signal configuration, and may further include the measurement configuration.

Optionally, after the network device sends the configuration of the unicast connection to the first terminal device, the method 500 may further include S531, S532, and S540.

S531: The first terminal device sends configuration information. Correspondingly, the second terminal device receives the configuration information.

Optionally, the configuration information may be shared by the first terminal device and the second terminal device.

In this case, the first terminal device may send the configuration information to the second terminal device when the first terminal device executes the configuration information.

Alternatively, the configuration information may include two parts, where one part is used by the first terminal device, and the other part is used by the second terminal device. Optionally, after receiving the configuration information, the first terminal device may execute configuration information generated by the network device for the first terminal device, and the first terminal device may send, to the second terminal device, configuration information generated by the network device for the second terminal device.

S532: The second terminal device sends fifth information. Correspondingly, the first terminal device receives the fifth information.

The fifth information may be used to indicate that the configuration of the unicast connection is completed.

Optionally, the second terminal device may execute the configuration information sent by the first terminal device after the second terminal device receives the configuration information, and if the configuration succeeds, send a configuration complete message, namely, the fifth information, to the first terminal device.

Optionally, if the configuration information cannot be executed, the second terminal device may indicate, to the first terminal device, that the configuration fails. For example, the second terminal device may send a configuration failure message to the first terminal device. The configuration failure message may be indication information, or may be other information. This is not limited in this embodiment of this application.

Optionally, when the second terminal device is in a connected state, the second terminal device may further send, to the network device connected to the second terminal device, the configuration information received from the first terminal device.

S540: The first terminal device sends fourth information. Correspondingly, the network device receives the fourth information.

The fourth information may be used to indicate that the configuration of the unicast connection is completed.

Optionally, the fourth information may indicate that both the first terminal device and the second terminal device successfully configure the unicast connection.

Alternatively, the fourth information may indicate only that the first terminal device successfully configures the unicast connection. Optionally, the fourth information may further carry a configuration result of the second terminal device, that is, the second terminal device successfully configures the unicast connection or fails to configure the unicast connection.

Alternatively, as long as one of the first terminal device and the second terminal device fails to configure the unicast connection, the first terminal device feeds back a configuration failure indication to the network device. Optionally, the configuration failure indication may further indicate that the first terminal device fails to configure the unicast connection, and/or the second terminal device fails to configure the unicast connection.

Optionally, as long as one terminal device fails to configure the unicast connection, the first terminal device may further trigger RRC re-establishment. Optionally, a re-establishment message may indicate that the first terminal device fails to configure the unicast connection, and/or the second terminal device fails to configure the unicast connection.

In this embodiment of this application, after the configuration of the unicast connection is completed, the first terminal device performs communication with the second terminal device via the unicast connection based on the configuration information.

Figure 6:
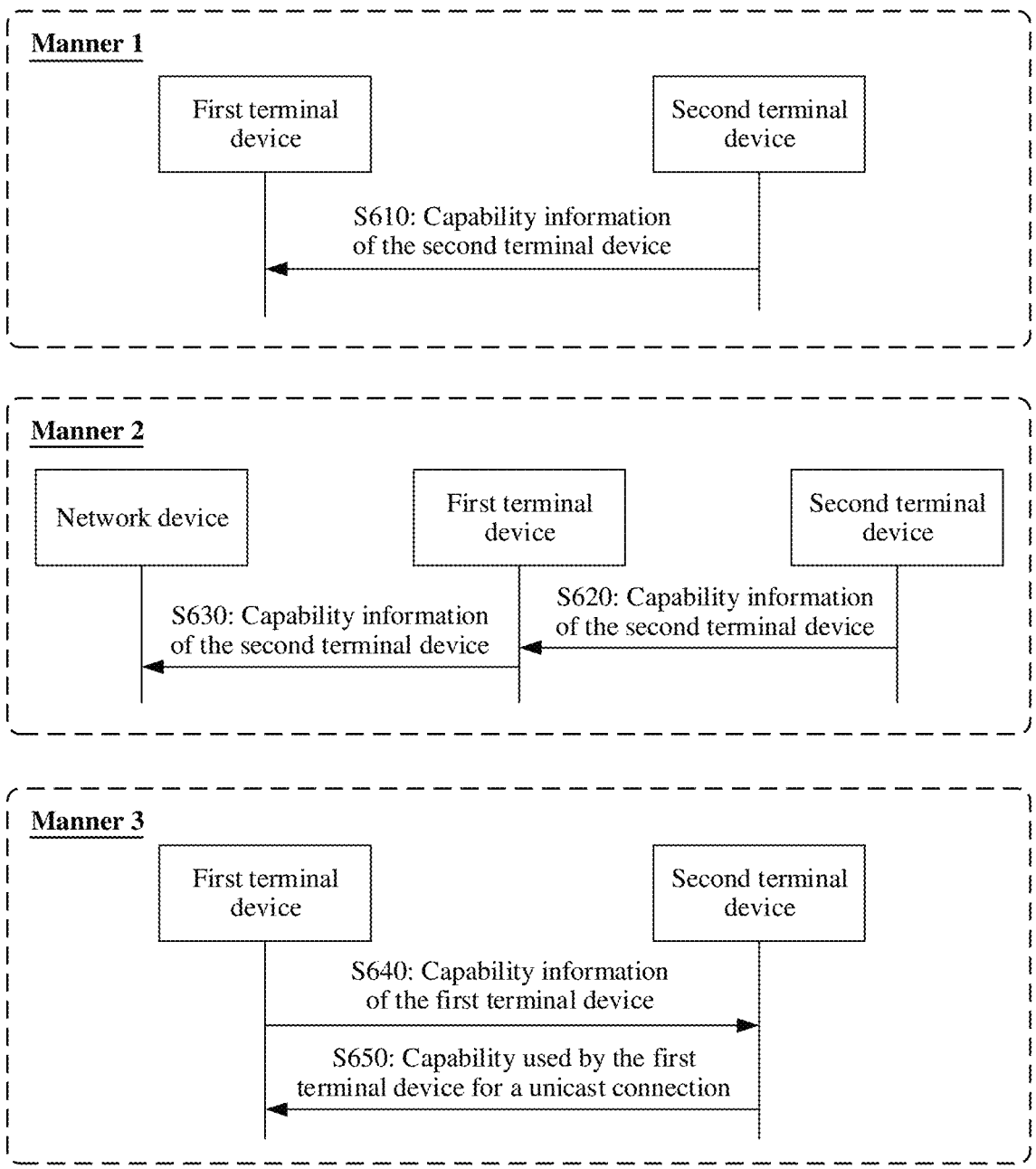
FIG. 6 is a schematic diagram of a communication method according to still another embodiment of this application.

FIG. 6 is a schematic flowchart of a communication method 600 according to an embodiment of this application. As shown in FIG. 6, the communication method 600 includes the following several implementations.

Manner 1: A first terminal device determines a capability used for a unicast connection.

S610: A second terminal device sends capability information of the second terminal device to the first terminal device.

The capability information of the second terminal device may be a currently available capability of the second terminal device, or the capability information of the second terminal device may be a total capability of the second terminal device.

Optionally, the capability information of the second terminal device may include one or more candidate capabilities. In other words, the currently available capability of the second terminal device may include one or more candidate capabilities, or the total capability of the second terminal device may include one or more candidate capabilities.

Optionally, the candidate capabilities may include a frequency band combination supported by the second terminal device. The second terminal device may support one or more frequency band combinations, and different frequency band combinations correspond to different quantities of supported MIMO layers.

Optionally, after receiving the capability information of the second terminal device, the first terminal device may select one capability from the one or more candidate capabilities included in the capability information of the second terminal device, as a capability used by the second terminal device for the unicast connection.

For example, the frequency band combinations supported by the second terminal device are frequency bands 1 and 2 and frequency bands 2 and 3, and a frequency band combination supported by the first terminal device is frequency bands 1 and 4. In this case, the first terminal device may determine that both the first terminal device and the second terminal device support the frequency band 1, and then the first terminal device may use the frequency bands 1 and 2 as the capability used by the second terminal device for the unicast connection.

Further, with reference to the method 300 in FIG. 3, the first terminal device may send the capability used by the second terminal device for the unicast connection to a network device, and then the network device generates a configuration of the unicast connection for the first terminal device and/or the second terminal device.

Optionally, if the first terminal device is in an idle state or an inactive state, the first terminal device does not need to send, to the network device, the capability used by the second terminal device for the unicast connection, but the first terminal device generates a configuration of the unicast connection for the first terminal device and/or the second terminal device.

Manner 2: A network device determines a capability used for a unicast connection.

S620: A second terminal device sends capability information of the second terminal device to a first terminal device.

The capability information of the second terminal device may be a currently available capability of the second terminal device, or the capability information of the second terminal device may be a total capability of the second terminal device.

Optionally, the capability information of the second terminal device includes one or more candidate capabilities. Optionally, the candidate capabilities may include a frequency band combination supported by the second terminal device.

S630: The first terminal device sends the capability information of the second terminal device to the network device.

Optionally, after receiving the capability information of the second terminal device, the first terminal device may directly send the capability information of the second terminal device to the network device.

Further, the network device may select one capability from the one or more candidate capabilities included in the capability information of the second terminal device, as a capability used by the second terminal device for the unicast connection. Further, the network device may generate a configuration of the unicast connection for the first terminal device and/or the second terminal device based on the capability used by the second terminal device for the unicast connection.

Optionally, with reference to the method 300 in FIG. 3, the network device may further send the capability used by the second terminal device for the unicast connection to the second terminal device by using S310 and S320.

Manner 3: A second terminal device determines a capability used for a unicast connection.

S640: A first terminal device sends capability information of the first terminal device to the second terminal device.

The capability information of the first terminal device may be a currently available capability of the first terminal device, or the capability information of the first terminal device may be a total capability of the first terminal device.

Optionally, the capability information of the first terminal device includes one or more candidate capabilities. Optionally, the candidate capabilities may include a frequency band combination supported by the first terminal device.

Optionally, the capability information of the first terminal device may include a list of frequency band combinations. For example, the list may include a currently available frequency band combination of the first terminal device, or the list may include an available frequency band combination allocated by the first terminal device to the unicast connection.

Further, after receiving the capability information of the first terminal device, the second terminal device may select one capability from the one or more candidate capabilities included in the capability information of the first terminal device, as a capability used by the first terminal device for the unicast connection.

In addition, the second terminal device may determine, based on the capability information of the first terminal device, a capability used by the second terminal device for the unicast connection.

S650: The second terminal device sends the capability used by the first terminal device for the unicast connection to the first terminal device.

The capability used by the first terminal device for the unicast connection is a capability that is used by the first terminal device for the unicast connection and that is determined by the second terminal device. This may be understood as that the second terminal device selects one capability of the first terminal device from the candidate capabilities provided by the first terminal device, and notifies the first terminal device of a selection result.

Optionally, the second terminal device may further send, to the first terminal device, the capability that is determined by the second terminal device to be used for the unicast connection.

Further, with reference to the method 300 in FIG. 3, the first terminal device may send the capability used by the second terminal device for the unicast connection to a network device, and then the network device generates a configuration of the unicast connection for the first terminal device and/or the second terminal device.

Alternatively, the first terminal device may send, to the network device, the capability used by the first terminal device for the unicast connection and the capability used by the second terminal device for the unicast connection, and then the network device generates a configuration of the unicast connection for the first terminal device and/or the second terminal device.

Optionally, if the first terminal device is in an idle state or an inactive state, the first terminal device does not need to send, to the network device, the capability used by the second terminal device for the unicast connection, but the first terminal device generates a configuration of the unicast connection for the first terminal device and/or the second terminal device.

The following describes in detail communications apparatuses in this application with reference to FIG. 7 to FIG. 10.

Figure 7:
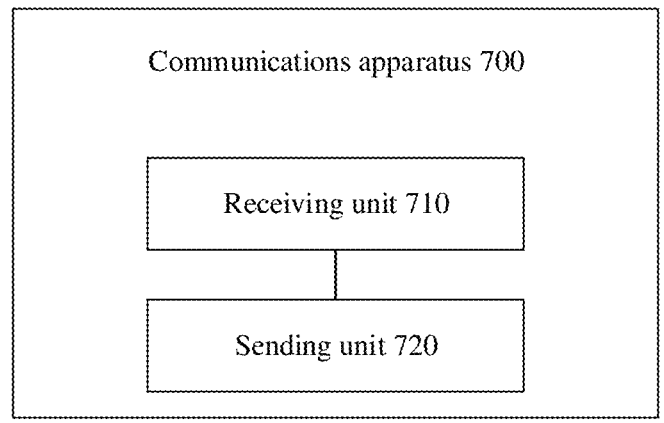
FIG. 7 is a schematic structural diagram of a communications apparatus according to an embodiment of this application.

FIG. 7 is a schematic block diagram of a communications apparatus according to an embodiment of this application. As shown in FIG. 7, the communications apparatus 700 may include a receiving unit 710 and a sending unit 720.

In a possible design, the communications apparatus 700 may correspond to the first terminal device in the foregoing method embodiments. For example, the communications apparatus 700 may be the first terminal device, or may be a chip disposed in the first terminal device. The communications apparatus 700 can perform a step performed by the first terminal device in FIG. 3, FIG. 4, FIG. 5, or FIG. 6.

The receiving unit 710 is configured to receive first information sent by a network device, where the first information includes indication information of a first unicast connection and a reference signal configuration of the first unicast connection, the reference signal configuration is used by the first terminal device to send a reference signal to a second terminal device, and the first unicast connection is a unicast connection established by the first terminal device and the second terminal device on a sidelink.

The sending unit 720 is configured to send, by the first terminal device, the reference signal to the second terminal device on the sidelink based on the reference signal configuration.

Optionally, the reference signal configuration includes first indication information and/or a first parameter configuration, the first indication information is used to indicate the first terminal device to send the reference signal to the second terminal device, and the first parameter configuration includes a configuration used by the first terminal device to send the reference signal to the second terminal device.

Optionally, the first information further includes a measurement configuration of the first unicast connection, the measurement configuration is used by the second terminal device to perform measurement, and the sending unit 720 is further configured to send, by the first terminal device, the measurement configuration to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the receiving unit 710 is further configured to receive second information sent by the second terminal device, where the second information is used to indicate that the second terminal device successfully completes configuration.

Optionally, the sending unit 720 is further configured to send third information to the network device, where the third information is used to indicate that the first terminal device successfully completes configuration and/or the third information is used to indicate that the second terminal device successfully completes configuration.

Optionally, the receiving unit 710 is further configured to receive a measurement result from the second terminal device, where the measurement result is a result obtained by the second terminal device by measuring the reference signal on the first unicast connection.

Optionally, the sending unit 720 is further configured to send the measurement result and the indication information of the first unicast connection to the network device.

It should be noted that the sending unit and the receiving unit may be a same transceiver unit. In addition to the transceiver unit, the communications apparatus 700 may further include another unit. This is not limited in this application.

It should be understood that the communications apparatus 700 according to this embodiment of this application may correspond to the method performed by the first terminal device in the foregoing method embodiments, and the foregoing and other management operations and/or functions of the units/modules in the communications apparatus 700 are intended to implement the corresponding steps of the method performed by the first terminal device in the foregoing method embodiments, and therefore can also implement beneficial effects in the foregoing method embodiments. For brevity, details are not described herein.

It should be further understood that each unit/module in the communications apparatus 700 may be implemented in a form of software and/or hardware. This is not specifically limited. In other words, the communications apparatus 700 is presented in a form of a function module. The "unit" herein may be an application-specific integrated circuit ASIC, a circuit, a processor that executes one or more software or firmware programs, a memory, an integrated logic circuit, and/or another component that can provide the foregoing functions.

The communications apparatus 700 in the foregoing solution may have a function for implementing the corresponding steps performed by the first terminal device in the foregoing methods. The function may be implemented by hardware, or may be implemented by hardware executing corresponding software. The hardware or the software includes one or more modules corresponding to the foregoing function. For example, the sending unit may be replaced with a transmitting machine, the receiving unit may be replaced with a receiving machine, and another unit such as a determining unit may be replaced with a processor, to respectively perform a sending operation, a receiving operation, and a related processing operation in the method embodiments.

In this embodiment of this application, the communications apparatus in FIG. 7 may alternatively be a chip or a chip system, for example, a system-on-a-chip (system on chip, SoC). Correspondingly, the receiving unit and the sending unit may be a transceiver circuit of the chip. This is not limited herein.

Figure 8:
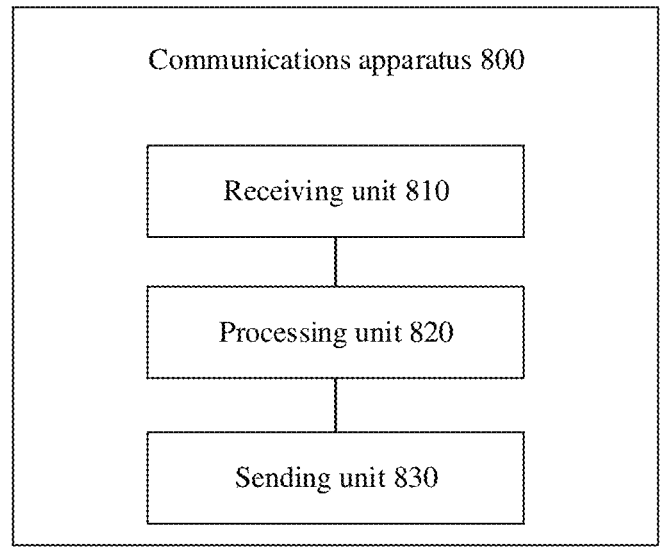
FIG. 8 is another schematic structural diagram of a communications apparatus according to an embodiment of this application.

FIG. 8 is a schematic block diagram of a communications apparatus according to an embodiment of this application. As shown in FIG. 8, the communications apparatus 800 may include a receiving unit 810, a processing unit 820, and a sending unit 830.

In a possible design, the communications apparatus 800 may correspond to the second terminal device in the foregoing method embodiments. For example, the communications apparatus 800 may be the second terminal device, or may be a chip disposed in the second terminal device. The communications apparatus 800 can perform a step performed by the second terminal device in FIG. 3, FIG. 4, FIG. 5, or FIG. 6.

The receiving unit 810 is configured to obtain a measurement configuration, where the measurement configuration is used by the second terminal device to perform measurement.

The receiving unit 810 is further configured to receive, on a sidelink based on the measurement configuration, a reference signal sent by the first terminal device.

The processing unit 820 is configured to perform measurement on the first unicast connection based on the reference signal, where the first unicast connection is a unicast connection established by the first terminal device and the second terminal device on a sidelink.

Optionally, the receiving unit 810 is specifically configured to receive the measurement configuration sent by the first terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the apparatus further includes the sending unit 830, configured to send second information to the first terminal device, where the second information is used to indicate that the second terminal device successfully completes configuration.

Optionally, the sending unit 830 is further configured to send a measurement result to the first terminal device, where the measurement result is a result obtained by the second terminal device by measuring the reference signal on the first unicast connection.

In another possible design, the communications apparatus 800 may correspond to the network device in the foregoing method embodiments. For example, the communications apparatus 800 may be the network device, or may be a chip disposed in the network device. The communications apparatus 800 can perform a step performed by the network device in FIG. 3, FIG. 4, FIG. 5, or FIG. 6.

The processing unit 820 is configured to determine first information, where the first information includes indication information of a first unicast connection and a reference signal configuration of the first unicast connection, the reference signal configuration is used by a first terminal device to send a reference signal to a second terminal device, and the first unicast connection is a unicast connection established by the first terminal device and the second terminal device on a sidelink.

The sending unit 830 is configured to send the first information to the first terminal device.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the first information further includes a measurement configuration of the first unicast connection, and the measurement configuration is used by the second terminal device to perform measurement.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the apparatus further includes the receiving unit 810, configured to receive third information sent by the first terminal device, where the third information is used to indicate that the first terminal device successfully completes configuration and/or the third information is used to indicate that the second terminal device successfully completes configuration.

Optionally, the receiving unit 810 is further configured to receive a measurement result and the indication information of the first unicast connection that are sent by the first terminal device, where the measurement result is a result obtained by the second terminal device by measuring the reference signal on the first unicast connection.

In another possible design, the communications apparatus 800 may correspond to the first terminal device in the foregoing method embodiments. For example, the communications apparatus 800 may be the first terminal device, or may be a chip disposed in the first terminal device. The communications apparatus 800 can perform a step performed by the first terminal device in FIG. 3, FIG. 4, FIG. 5, or FIG. 6.

The receiving unit 810 is configured to receive first capability information from a second terminal device, where the first capability information includes a capability that can be allocated by the second terminal device to a unicast connection, or the first capability information includes a capability allocated by the second terminal device to the unicast connection, and the unicast connection is a unicast connection established by the first terminal device and the second terminal device on a sidelink.

The sending unit 830 is configured to send second capability information to a network device, where the second capability information includes the capability allocated by the second terminal device to the unicast connection.

The receiving unit 810 is further configured to receive configuration information from the network device, where the configuration information includes a configuration of the unicast connection.

The processing unit 820 is configured to perform communication via the unicast connection based on the configuration information.

Optionally, the first capability information includes the capability allocated by the second terminal device to the unicast connection, and the sending unit 830 is further configured to send third capability information to the second terminal device, where the third capability information includes a capability that can be allocated by the first terminal device to the unicast connection, or a capability allocated by the first terminal device to the unicast connection.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the configuration information includes the reference signal configuration, and the reference signal configuration is used by the first terminal device to send a reference signal to the second terminal device.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the sending unit 830 is further configured to send the reference signal to the second terminal device.

Optionally, the receiving unit 810 is further configured to receive a measurement result and indication information of the first unicast connection from the second terminal device, where the measurement result is a result obtained by the second terminal device by measuring the reference signal on the first unicast connection.

Optionally, the sending unit 830 is further configured to send the measurement result and the indication information of the first unicast connection to the network device.

Optionally, the sending unit 830 is further configured to send fourth information to the network device, where the fourth information is used to indicate that the configuration of the unicast connection is completed.

In a possible design, the communications apparatus 800 may correspond to the network device in the foregoing method embodiments. For example, the communications apparatus 800 may be the network device, or may be a chip disposed in the network device. The communications apparatus 800 can perform a step performed by the network device in FIG. 3, FIG. 4, FIG. 5, or FIG. 6.

The receiving unit 810 is configured to obtain capability information of a first terminal device.

The receiving unit 810 is further configured to receive second capability information from the first terminal device, where the second capability information includes a capability allocated by a second terminal device to a unicast connection, and the unicast connection is a unicast connection established by the first terminal device and the second terminal device on a sidelink.

The processing unit 820 is configured to determine configuration information based on the capability information of the first terminal device and the second capability information, where the configuration information includes a configuration of the unicast connection.

The sending unit 830 is configured to send the configuration information to the first terminal device, where the second capability information includes a capability that the unicast connection is to have after the first terminal device configures the unicast connection based on the configuration information, and a capability indicated by the capability information of the first terminal device includes the capability that the unicast connection is to have after the first terminal device configures the unicast connection based on the configuration information.

Optionally, the capability information of the first terminal device includes a capability that can be allocated by the first terminal device to the unicast connection, or the capability information of the first terminal device includes a capability allocated by the first terminal device to the unicast connection.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the configuration information includes the reference signal configuration, and the reference signal configuration is used by the first terminal device to send a reference signal to the second terminal device.

Optionally, the reference signal configuration includes first indication information and/or a first parameter configuration, the first indication information is used to indicate the first terminal device to send the reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the receiving unit 810 is further configured to receive a measurement result and indication information of the first unicast connection from the first terminal device, where the measurement result is a result obtained by the second terminal device by measuring the reference signal on the first unicast connection.

Optionally, the receiving unit 810 is further configured to receive fourth information from the first terminal device, where the fourth information is used to indicate that configuration of the unicast connection is completed.

In another possible design, the communications apparatus 800 may correspond to the first terminal device in the foregoing method embodiments. For example, the communications apparatus 800 may be the first terminal device, or may be a chip disposed in the first terminal device. The communications apparatus 800 can perform a step performed by the first terminal device in FIG. 3, FIG. 4, FIG. 5, or FIG. 6.

The receiving unit 810 is configured to receive first capability information from a second terminal device, where the first capability information includes a capability that can be allocated by the second terminal device to a unicast connection, or the first capability information includes a capability allocated by the second terminal device to the unicast connection, and the unicast connection is a unicast connection established by the first terminal device and the second terminal device on a sidelink.

The processing unit 820 is configured to determine configuration information based on the first capability information and capability information of the first terminal device, where the configuration information includes a configuration of the unicast connection.

The processing unit 820 is further configured to configure the unicast connection based on the configuration information, where the second capability information includes a capability that the unicast connection is to have after the first terminal device configures the unicast connection based on the configuration information, and the first capability includes the capability that the unicast connection is to have after the first terminal device configures the unicast connection based on the configuration information.

Optionally, the capability information of the first terminal device includes a capability that can be allocated by the first terminal device to the unicast connection, or the capability information of the first terminal device includes a capability allocated by the first terminal device to the unicast connection.

Optionally, the first capability information includes the capability allocated by the second terminal device to the unicast connection, and the apparatus further includes the sending unit 830, configured to send, by the first terminal device, the capability information of the first terminal device to the second terminal device before the first terminal device receives the first capability information from the second terminal device.

Optionally, the capability includes one or more of the following: a supported frequency band combination, a supported frequency band, a supported carrier aggregation, a supported duplication function, supported bandwidth, a quantity of supported multiple-input multiple-output MIMO layers, a measurement capability, a subcarrier spacing, a modulation/demodulation capability, or maximum power.

Optionally, the configuration information includes one or more of the following: a bearer configuration of the unicast connection, a carrier configuration of the unicast connection, a reference signal configuration of the unicast connection, or a measurement configuration of the unicast connection.

Optionally, the reference signal configuration includes first indication information and/or a first parameter configuration, the first indication information is used to indicate the first terminal device to send a reference signal to the second terminal device, and the first parameter configuration includes a parameter configuration used by the first terminal device to send the reference signal to the second terminal device.

Optionally, the measurement configuration includes second indication information and/or a second parameter configuration, the second indication information is used to indicate the second terminal device to perform measurement, the second parameter configuration includes a parameter configuration used by the second terminal device to perform measurement, and the second parameter configuration includes one or more of the following: the third parameter configuration, a measurement quantity configuration, a measurement report configuration, or a measurement identifier, where the third parameter configuration is used by the second terminal device to receive the reference signal.

Optionally, the sending unit 830 is further configured to send the reference signal to the second terminal device.

Optionally, the receiving unit 810 is further configured to receive a measurement result and indication information of the first unicast connection from the second terminal device, where the measurement result is a result obtained by the second terminal device by measuring the reference signal on the first unicast connection.

It should be noted that the receiving unit 810 and the sending unit 830 may be a same transceiver unit. In addition to the receiving unit 810, the processing unit 820, and the sending unit 830, the communications apparatus 800 may further include another unit. This is not limited in this application.

It should be further understood that each unit/module in the communications apparatus 800 may be implemented in a form of software and/or hardware. This is not specifically limited. In other words, the communications apparatus 800 is presented in a form of a function module. The "unit" herein may be an application-specific integrated circuit ASIC, a circuit, a processor that executes one or more software or firmware programs, a memory, an integrated logic circuit, and/or another component that can provide the foregoing functions.

The communications apparatus 800 in the foregoing solution has a function for implementing the corresponding steps performed by the network device in the foregoing methods. The function may be implemented by hardware, or may be implemented by hardware executing corresponding software. The hardware or the software includes one or more modules corresponding to the foregoing function. For example, the sending unit may be replaced with a transmitting machine, a receiving unit may be replaced with a receiving machine, and another unit such as a determining unit may be replaced with a processor, to respectively perform a sending operation, a receiving operation, and a related processing operation in the method embodiments.

In this embodiment of this application, the communications apparatus in FIG. 8 may alternatively be a chip or a chip system, for example, a system-on-a-chip (system on chip, SoC). Correspondingly, the receiving unit and the sending unit may be a transceiver circuit of the chip. This is not limited herein.

Figure 9:
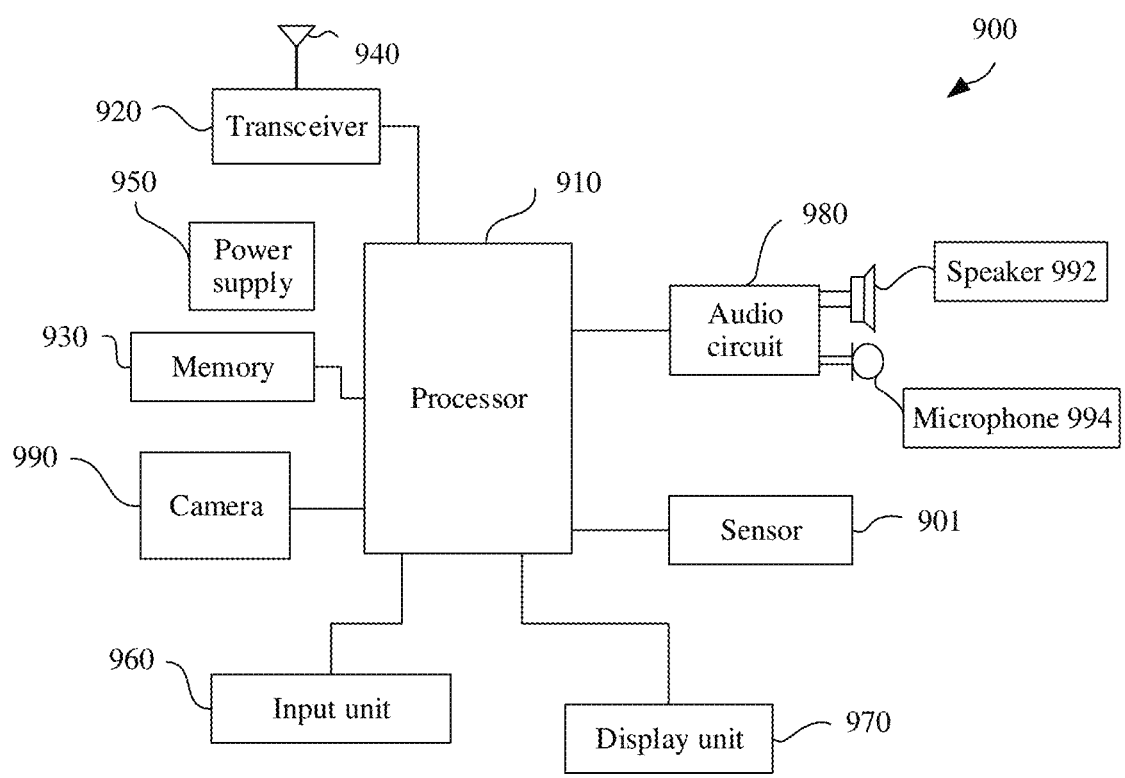
FIG. 9 is still another schematic structural diagram of a communications apparatus according to an embodiment of this application.

FIG. 9 is a schematic structural diagram of a communications apparatus 900 according to an embodiment of this application. For example, the communications apparatus 900 may be a terminal device, for example, a first terminal device or a second terminal device, and is applied to the system shown in FIG. 1, to perform a function of the first terminal device or the second terminal device in the foregoing method embodiments. The communications apparatus may alternatively be a chip in a terminal device, a vehicle-mounted communications terminal, a vehicle-mounted communications chip, or the like.

As shown in the figure, the communications apparatus 900 includes a processor 910 and a transceiver 920. Optionally, the communications apparatus 900 may further include a memory 930. The processor 910, the transceiver 920, and the memory 930 may communicate with each other by using an internal connection path, to transfer a control and/or data signal. The memory 930 is configured to store a computer program. The processor 910 is configured to invoke the computer program from the memory 930 and run the computer program, to control the transceiver 920 to send and receive a signal. Optionally, the communications apparatus 900 may further include an antenna 940, configured to send, by using a radio signal, uplink data or uplink control signaling that is output by the transceiver 920.

The processor 910 and the memory 930 may be integrated into one processing apparatus. The processor 910 is configured to execute program code stored in the memory 930 to implement the foregoing function. During specific implementation, the memory 930 may alternatively be integrated into the processor 910, or may be independent of the processor 910. The processor 910 may correspond to the processing unit of the communications apparatus 800.

The transceiver 920 may correspond to the receiving unit 710 and the sending unit 720 in FIG. 7, or the receiving unit 810 and the sending unit 830 in FIG. 8, and may also be referred to as a communications unit. The transceiver 920 may include a receiver (or referred to as a receiving machine or a receiving circuit) and a transmitter (or referred to as a transmitting machine or a transmitting circuit). The receiver is configured to receive a signal, and the transmitter is configured to transmit a signal.

It should be understood that the communications apparatus 900 shown in FIG. 9 can implement processes related to the first terminal device or the second terminal device in the method embodiments shown in FIG. 3, FIG. 4, FIG. 5, and FIG. 6. Operations and/or functions of the modules in the communications apparatus 900 are respectively for implementing corresponding procedures in the foregoing method embodiments. For details, refer to the descriptions in the foregoing method embodiments. To avoid repetition, detailed descriptions are appropriately omitted herein.

The processor 910 may be configured to perform an action that is implemented inside the first terminal device or the second terminal device and that is described in the foregoing method embodiments, and the transceiver 920 may be configured to perform an action, of receiving from the network device or sending to the network device, that is performed by the first terminal device and that is described in the foregoing method embodiments. For details, refer to the descriptions in the foregoing method embodiments. Details are not described herein again.

Optionally, the communications apparatus 900 may further include a power supply 950, configured to supply power to various components or circuits in the terminal device.

In addition, to make the functions of the terminal device more perfect, the communications apparatus 900 may further include one or more of an input unit 960, a display unit 970, an audio circuit 980, a camera 990, a sensor 901, and the like, and the audio circuit may further include a speaker 982, a microphone 984, and the like.

It should be noted that the communications apparatus 900 may alternatively be the second terminal device in any one of the foregoing method embodiments, to implement a step or a function of the second terminal device in any one of the foregoing implementations.

Figure 10:
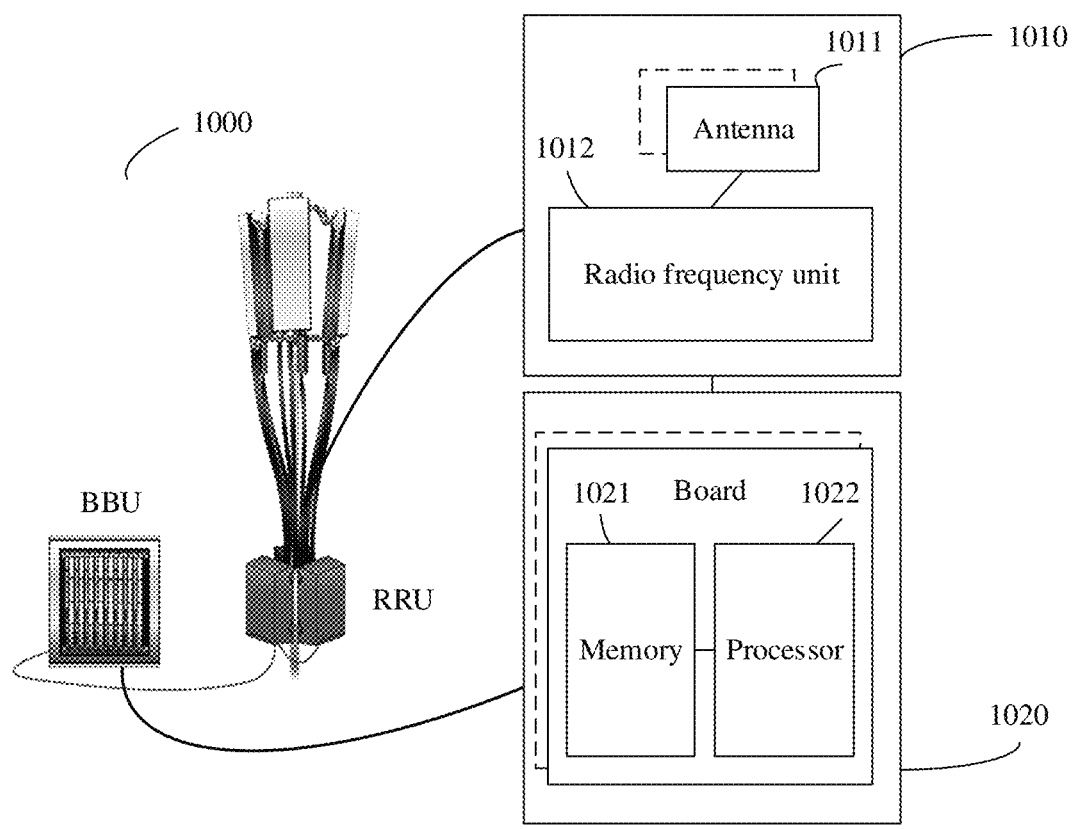
FIG. 10 is still another schematic structural diagram of a communications apparatus according to an embodiment of this application.

FIG. 10 is a schematic structural diagram of a communications apparatus 1000 according to an embodiment of this application, for example, may be a schematic structural diagram of a network device. The network device 1000 may be applied to the system shown in FIG. 1, to perform a function of the network device in the foregoing method embodiments.

As shown in the figure, for example, the network device 1000 may include one or more radio frequency units, for example, a remote radio unit (RRU) 1010, and one or more baseband units (BBU) (which may also be referred to as digital units, digital unit, DU) 1020. The RRU 1010 may be referred to as a communications unit or a transceiver unit, and corresponds to the receiving unit 710 and the sending unit 720 in FIG. 7, or the receiving unit 810 and the sending unit 830 in FIG. 8. Optionally, the transceiver unit 1010 may also be referred to as a transceiver machine, a transceiver circuit, a transceiver, or the like, and may include at least one antenna 1011 and a radio frequency unit 1012.

Optionally, the transceiver unit 1010 may include a receiving unit and a sending unit. The receiving unit may correspond to a receiver (or referred to as a receiving machine or a receiving circuit), and the sending unit may correspond to a transmitter (or referred to as a transmitting machine or a transmitting circuit). For another example, the transceiver unit 1010 may be implemented by using a same module, for example, by using a transceiver circuit module. The RRU 1010 is mainly configured to send and receive a radio frequency signal and perform conversion between a radio frequency signal and a baseband signal, for example, configured to send first information to a terminal device. The BBU 1020 is mainly configured to: perform baseband processing, control the network device, and the like. The RRU 1010 and the BBU 1020 may be physically disposed together, or may be physically disposed separately, to be specific, may be distributed base stations.

The BBU 1020 may be a control part of the network device, may also be referred to as a processing unit, may correspond to the processing unit included in the communications apparatus 600, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, send the foregoing configuration information.

In an example, the BBU 1020 may include one or more boards, and a plurality of boards may jointly support a radio access network (such as an LTE network) of a single access standard, or may separately support radio access networks (for example, an LTE network, a 5G network, and another network) of different access standards. The BBU 1020 further includes a memory 1021 and a processor 1022. The memory 1021 is configured to store a necessary instruction and necessary data. The processor 1022 is configured to control the network device to perform a necessary action, for example, is configured to control the network device to perform the operation procedure related to the network device in the foregoing method embodiments. The memory 1021 and the processor 1022 may serve one or more boards. In other words, a memory and a processor may be disposed on each board. Alternatively, a plurality of boards may share a same memory and a same processor. In addition, a necessary circuit may further be disposed on each board.

It should be understood that the network device 1000 shown in FIG. 10 can implement the processes related to the network device in the method embodiments shown in FIG. 3, FIG. 4, FIG. 5, and FIG. 6. Operations and/or functions of the modules in the network device 1000 are respectively for implementing corresponding procedures in the foregoing method embodiments. For details, refer to the descriptions in the foregoing method embodiments. To avoid repetition, detailed descriptions are appropriately omitted herein.

The BBU 1020 may be configured to perform an action that is implemented inside the network device and that is described in the foregoing method embodiments, and the RRU 1010 may be configured to perform an action, of sending to a terminal device or receiving from a terminal device, that is performed by the network device and that is described in the foregoing method embodiments. For details, refer to the descriptions in the foregoing method embodiments. Details are not described herein again.

An embodiment of this application further provides a processing apparatus, including a processor and an interface. The processor is configured to perform the method in any foregoing method embodiment.

It should be understood that, the processor in this embodiment of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in this embodiment of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

It should be understood that the term "and/or" in this specification describes only an association relationship for describing associated objects and represents that three relationships may exist. For example, A and/or B may represent the following three cases: Only A exists, both A and B exist, and only B exists. A and B may be singular or plural. In addition, the character "/" in this specification generally represents an "or" relationship between the associated objects, but may alternatively represent an "and/or" relationship. For details, refer to foregoing and following descriptions for understanding.

In this application, "at least one" means one or more, and "a plurality of" means two or more. "At least one of the following items" or a similar expression thereof means any combination of the items, and includes any combination of one item or a plurality of items. For example, at least one of a, b, or c may represent: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for convenience and brevity of description, for specific working procedures of the system, apparatus, and units described in the foregoing, refer to corresponding procedures in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications apparatus, wherein the communications apparatus is a first terminal device or a chip disposed in the first terminal device, the communications apparatus comprising:
   at least one processor, and a memory storing instructions for execution by the at least one processor;

wherein, when executed, the instructions cause the communications apparatus to perform operations comprising:

sending configuration information to a second terminal device, wherein the configuration information comprises a configuration of a unicast connection between the first terminal device and the second terminal device on a sidelink; and receiving a configuration failure message from the second terminal device, wherein the configuration failure message indicates that the second terminal device fails to configure the unicast connection based on the configuration of the unicast connection.

2. The communications apparatus according to claim 1, wherein the operations further comprise:

sending configuration failure indication information to a network device, wherein the configuration failure indication information indicates that the second terminal device fails to configure the unicast connection.

3. The communications apparatus according to claim 2, wherein the configuration information comprises at least one of a reference signal configuration or a measurement configuration, the measurement configuration useable by the second terminal device to perform measurement.

4. The communications apparatus according to claim 2, wherein before the sending the configuration information to the second terminal device, the operations further comprise:
receiving the configuration information from the network device.

5. The communications apparatus according to claim 1, wherein the configuration information comprises at least one of a reference signal configuration or a measurement configuration, the measurement configuration usable by the second terminal device to perform measurement.

6. The communications apparatus according to claim 1, wherein before the sending the configuration information to the second terminal device, the operations further comprise:
receiving the configuration information from a network device.

7. A communication method, comprising:

sending, by a first terminal device, configuration information to a second terminal device, wherein the configuration information comprises a configuration of a unicast connection between the first terminal device and the second terminal device on a sidelink; and receiving, by the first terminal device, a configuration failure message from the second terminal device, wherein the configuration failure message indicates that the second terminal device fails to configure the unicast connection based on the configuration of the unicast connection.

8. The communication method according to claim 7, wherein the method further comprises:

sending, by the first terminal device, configuration failure indication information to a network device, wherein the configuration failure indication information indicates that the second terminal device fails to configure the unicast connection.

9. The communication method according to claim 8, wherein the configuration information comprises at least one of a reference signal configuration or a measurement configuration, the measurement configuration usable by the second terminal device to perform measurement.

10. The communication method according to claim 8, wherein before the sending the configuration information to the second terminal device, the method further comprises:

receiving, by the first terminal device, the configuration information from the network device.

11. The communication method according to claim 7, wherein the configuration information comprises at least one of a reference signal configuration or a measurement configuration, the measurement configuration usable by the second terminal device to perform measurement.

12. The communication method according to claim 7, wherein before the sending the configuration information to the second terminal device, the method further comprises:
receiving, by the first terminal device, the configuration information from a network device.

13. A communications apparatus, comprising:

at least one processor, and a memory storing instructions for execution by the at least one processor;

wherein, when executed, the instructions cause the communication apparatus to perform operations comprising:

sending configuration information to a first terminal device, wherein the configuration information comprises a configuration of a unicast connection between the first terminal device and a second terminal device on a sidelink, the configuration information is to be sent by the first terminal device to the second terminal device; and receiving a configuration failure indication information from the first terminal device, wherein the configuration failure indication information indicates that the second terminal device fails to configure the unicast connection based on the configuration of the unicast connection.

14. The communications apparatus according to claim 13, wherein the configuration information comprises at least one of a reference signal configuration or a measurement configuration, the measurement configuration usable by the second terminal device to perform measurement.

15. The communications apparatus according to claim 13, wherein the communications apparatus is a network device or a chip disposed in the network device.

16. A non-transitory computer readable storage medium, storing at least one instruction, which when executed by at least one processor, causes a communication apparatus comprising the at least one processor to:

send configuration information to a second terminal device, wherein the configuration information comprises a configuration of a unicast connection between a first terminal device and the second terminal device on a sidelink; and receive a configuration failure message from the second terminal device, wherein the configuration failure message indicates that the second terminal device fails to configure the unicast connection based on the configuration of the unicast connection.

17. The non-transitory computer readable storage medium according to claim 16, wherein the at least one instruction, when executed by the at least one processor, further causes the communication apparatus comprising the at least one processor to:

send configuration failure indication information to a network device, wherein the configuration failure indication information indicates that the second terminal device fails to configure the unicast connection.

18. The non-transitory computer readable storage medium according to claim 17, wherein the configuration information comprises at least one of a reference signal configuration or a measurement configuration, the measurement configuration usable by the second terminal device to perform measurement.

19. The non-transitory computer readable storage medium according to claim 16, wherein the configuration information comprises at least one of a reference signal configuration or a measurement configuration, the measurement configuration usable by the second terminal device to perform measurement.

20. The non-transitory computer readable storage medium according to claim 16, wherein the at least one instruction, when executed by the at least one processor, further causes the communication apparatus comprising the at least one processor to:
   receive the configuration information from a network device before sending the configuration information to the second terminal device.

* * * * *